Dec. 30, 1969  R. E. MORGAN  3,487,234
TIME RATIO CONTROL AND INVERTER POWER CIRCUITS
Original Filed Dec. 26, 1963  13 Sheets-Sheet 1
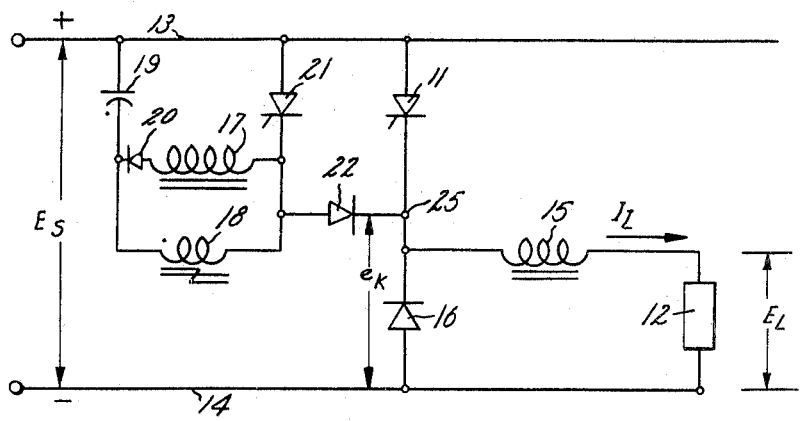
Fig. 1.
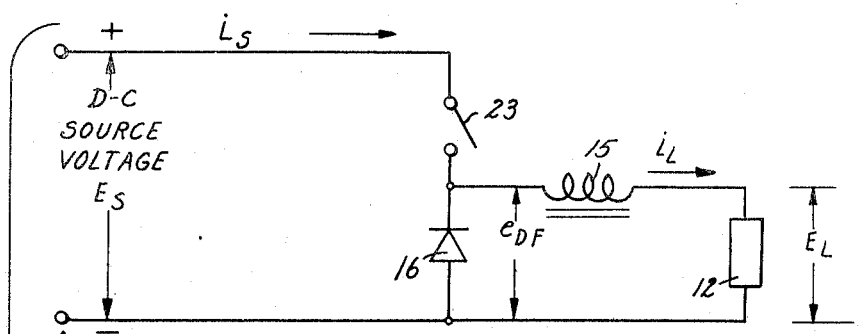
Fig. 3.
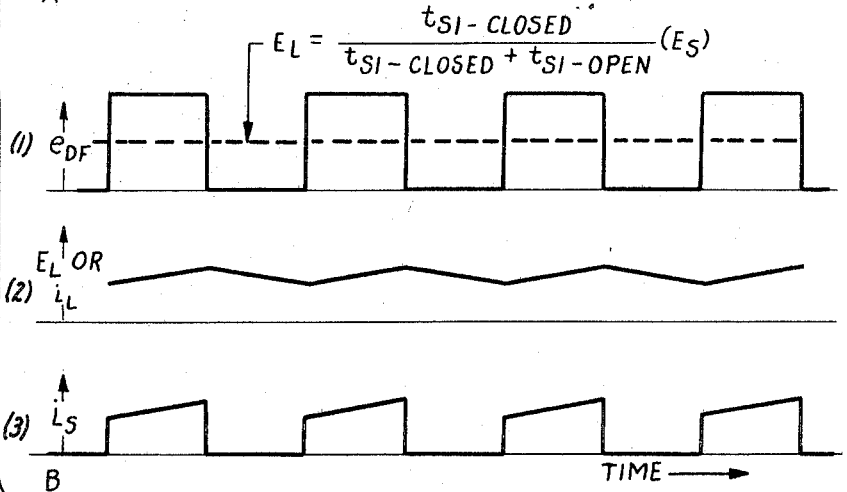
Inventor
Raymond E. Morgan
by Donald R. Campbell
His Attorney

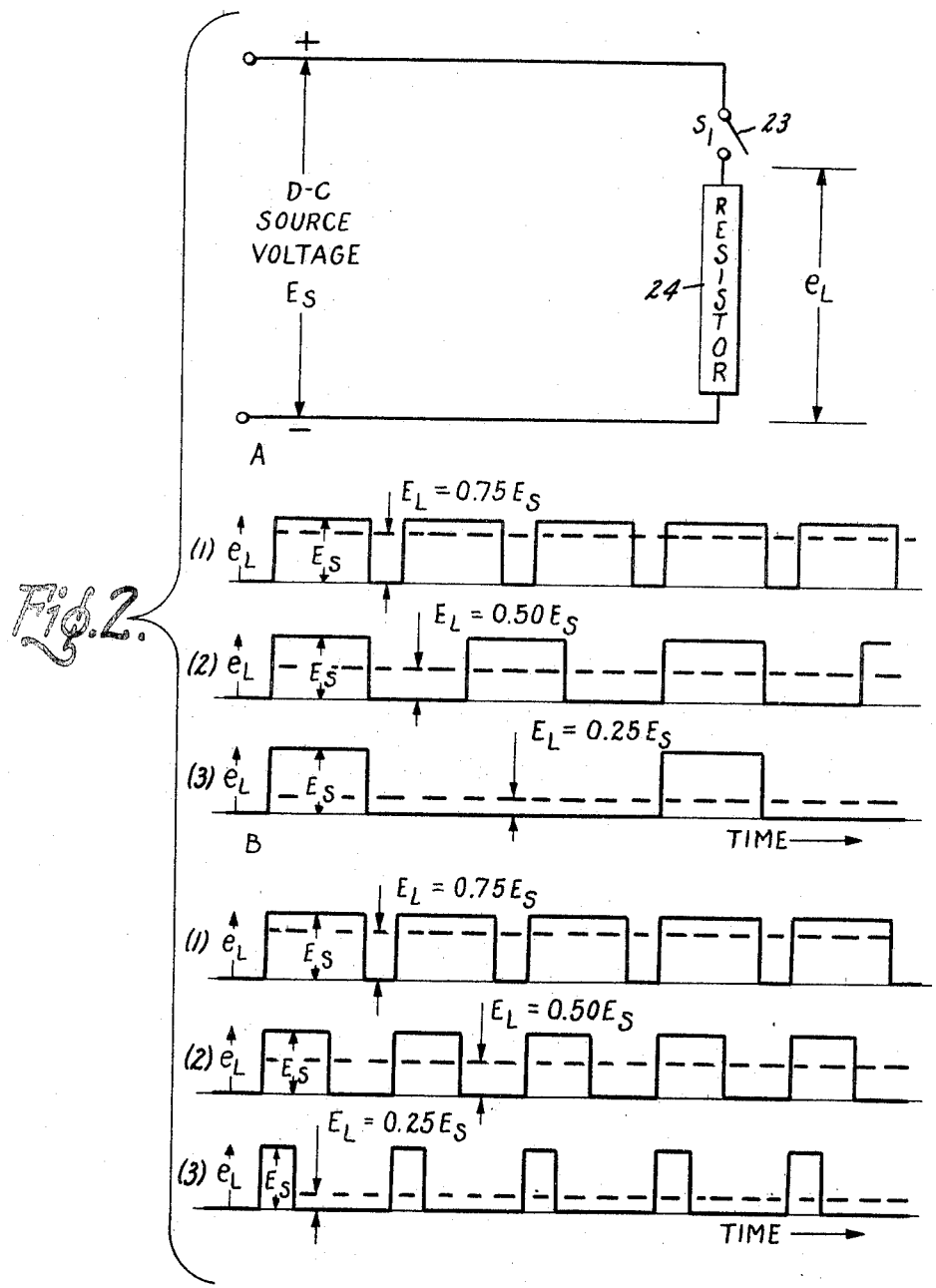

Dec. 30, 1969 R. E. MORGAN 3,487,234
TIME RATIO CONTROL AND INVERTER POWER CIRCUITS
Original Filed Dec. 26, 1963 13 Sheets-Sheet 3
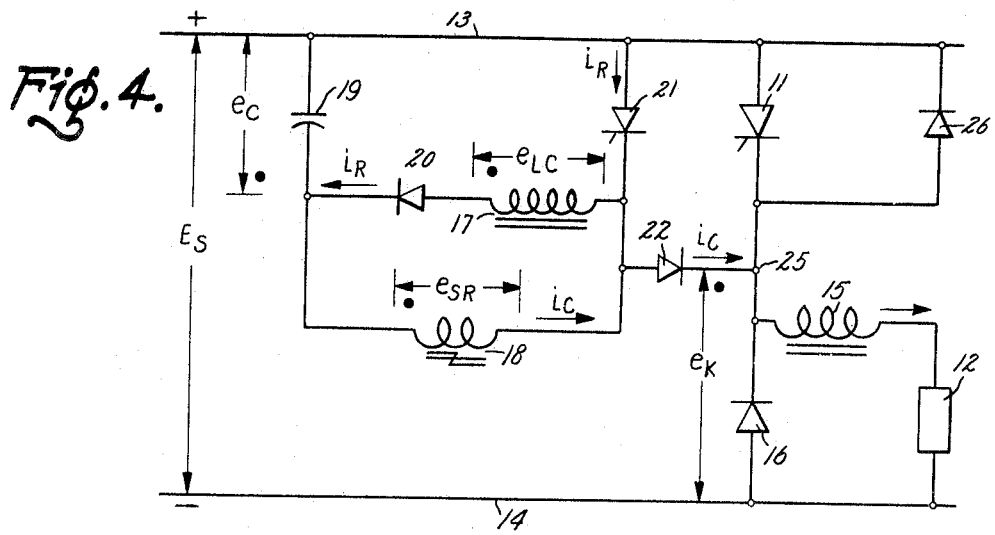
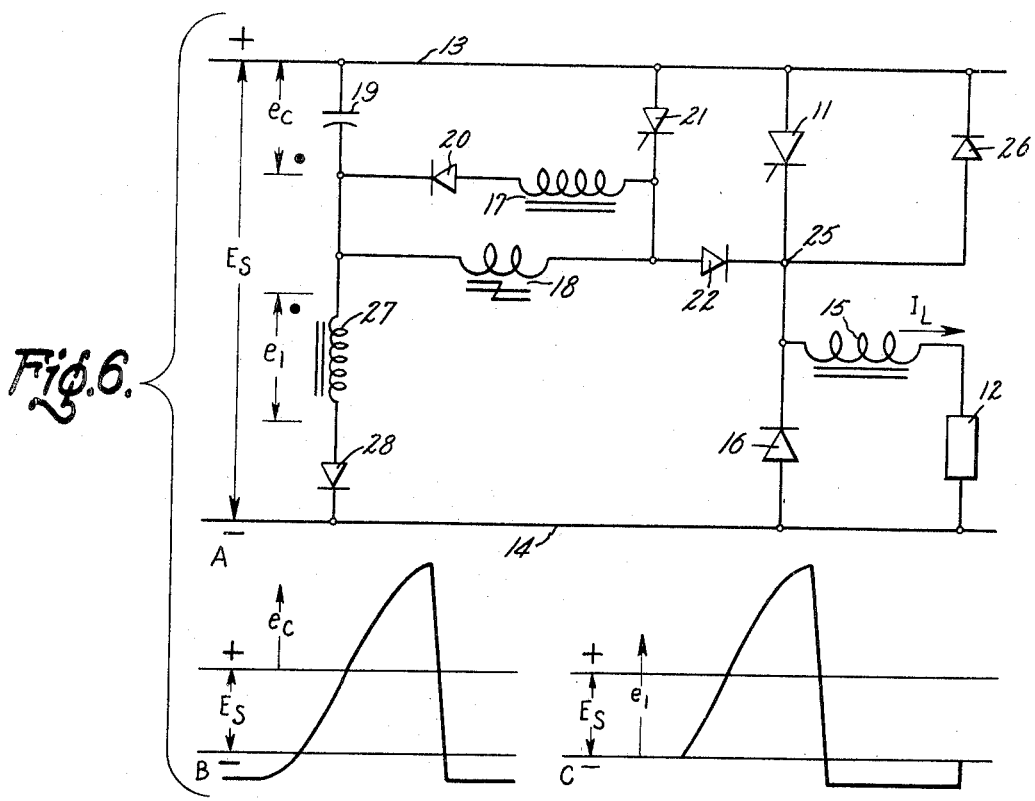
Inventor
Raymond E. Morgan
by Donald R. Campbell
His Attorney

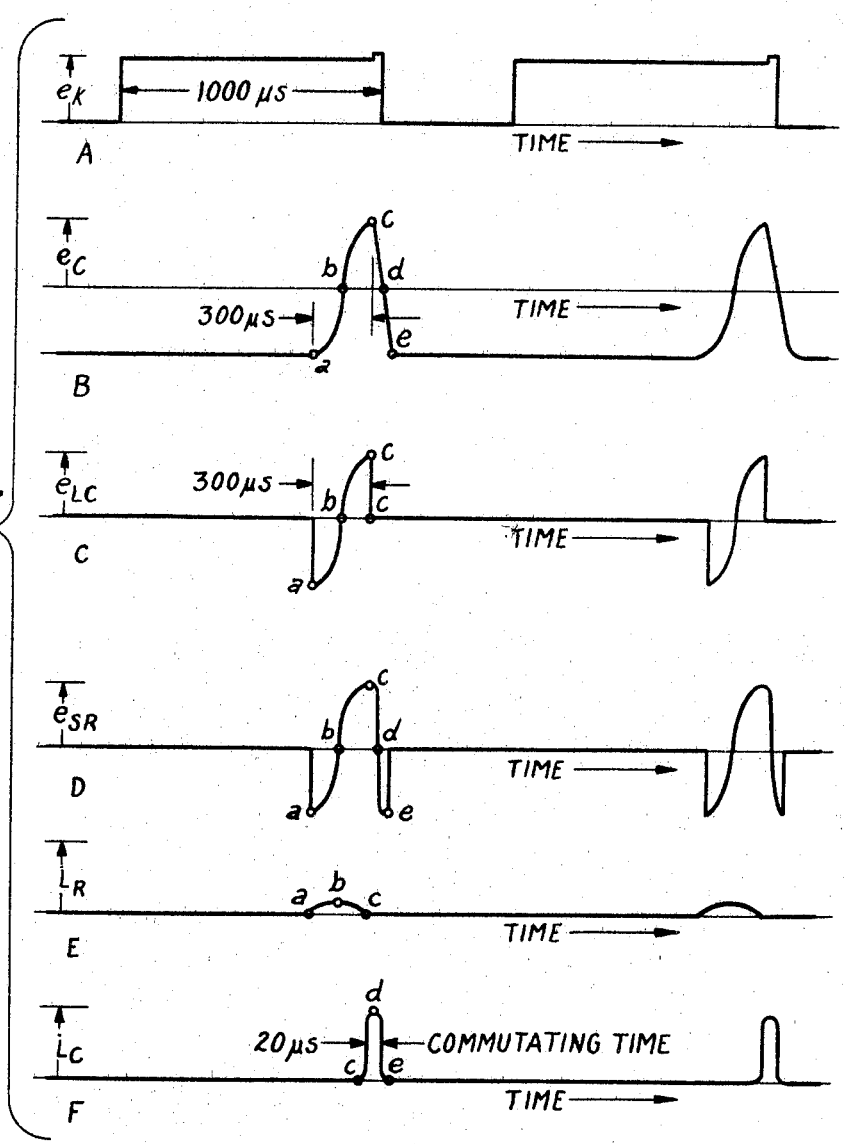

Inventor
Raymond E. Morgan
by Donald R. Campbell
His Attorney

Dec. 30, 1969 R. E. MORGAN 3,487,234
TIME RATIO CONTROL AND INVERTER POWER CIRCUITS
Original Filed Dec. 26, 1963 13 Sheets-Sheet 6

Inventor
Raymond E. Morgan
by Donald R. Campbell
His Attorney

Dec. 30, 1969  R. E. MORGAN  3,487,234
TIME RATIO CONTROL AND INVERTER POWER CIRCUITS
Original Filed Dec. 26, 1963  13 Sheets-Sheet 7
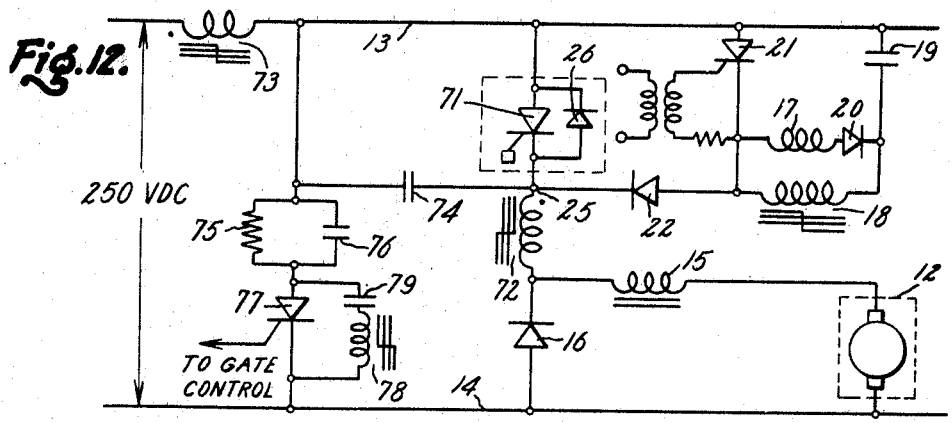
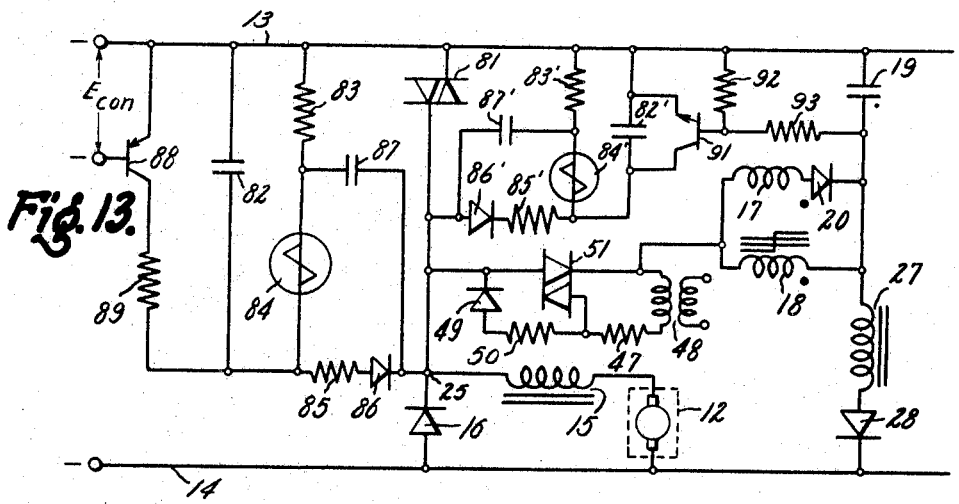
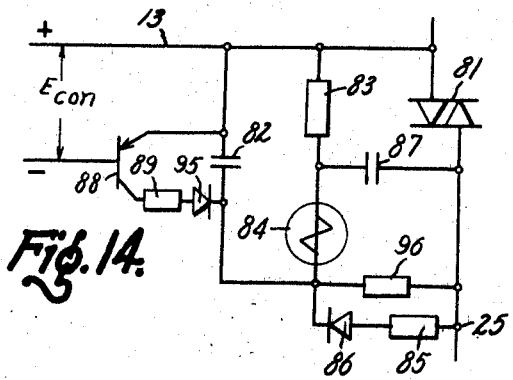
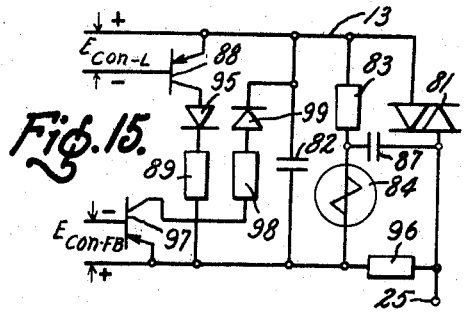
Inventor
Raymond E. Morgan
by Donald R. Campbell
His Attorney Dec. 30, 1969  R. E. MORGAN  3,487,234
TIME RATIO CONTROL AND INVERTER POWER CIRCUITS
Original Filed Dec. 26, 1963  13 Sheets-Sheet 8

Inventor:
Raymond E. Morgan,
by Donald R. Campbell
His Attorney.

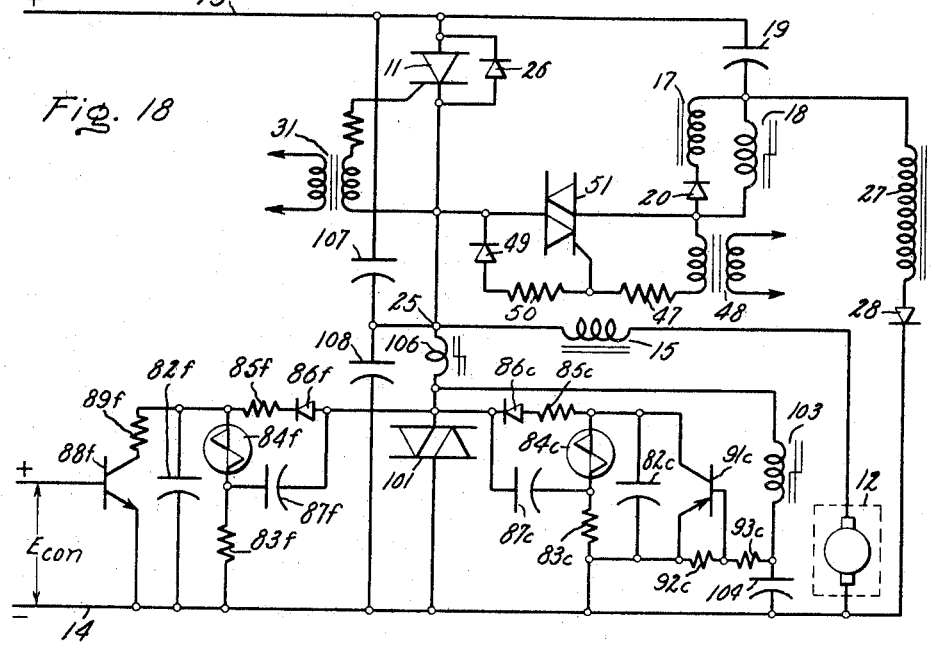
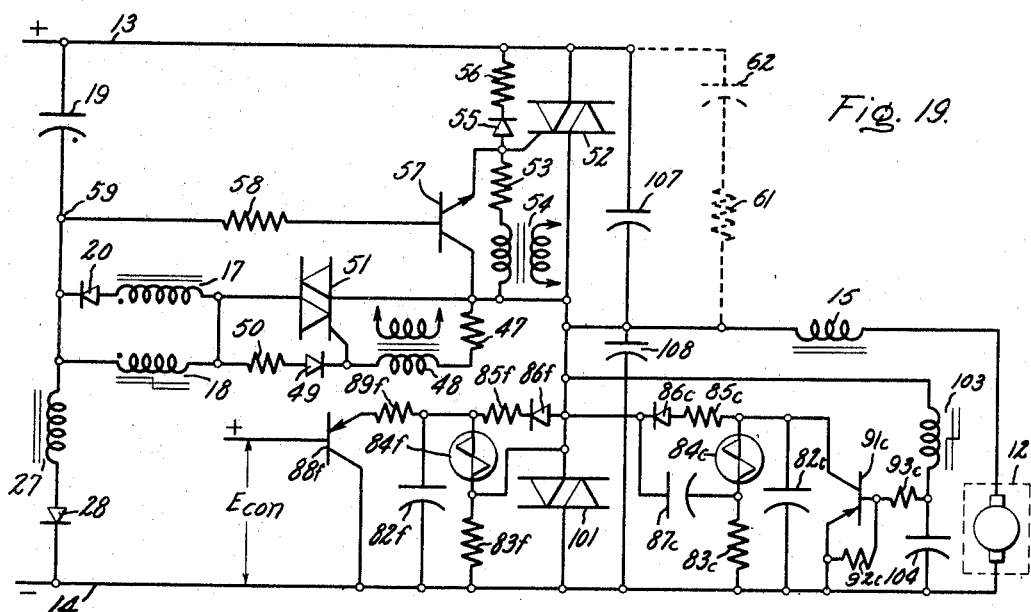

Inventor:
Raymond E. Morgan,
by Donald R. Campbell
His Attorney.

Dec. 30, 1969        R. E. MORGAN        3,487,234
TIME RATIO CONTROL AND INVERTER POWER CIRCUITS
Original Filed Dec. 26, 1963        13 Sheets-Sheet 11
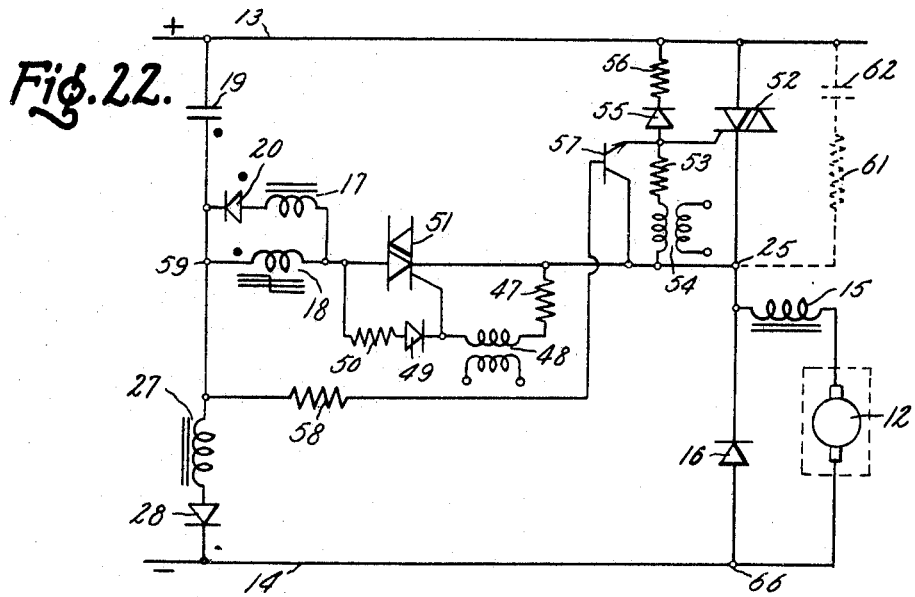
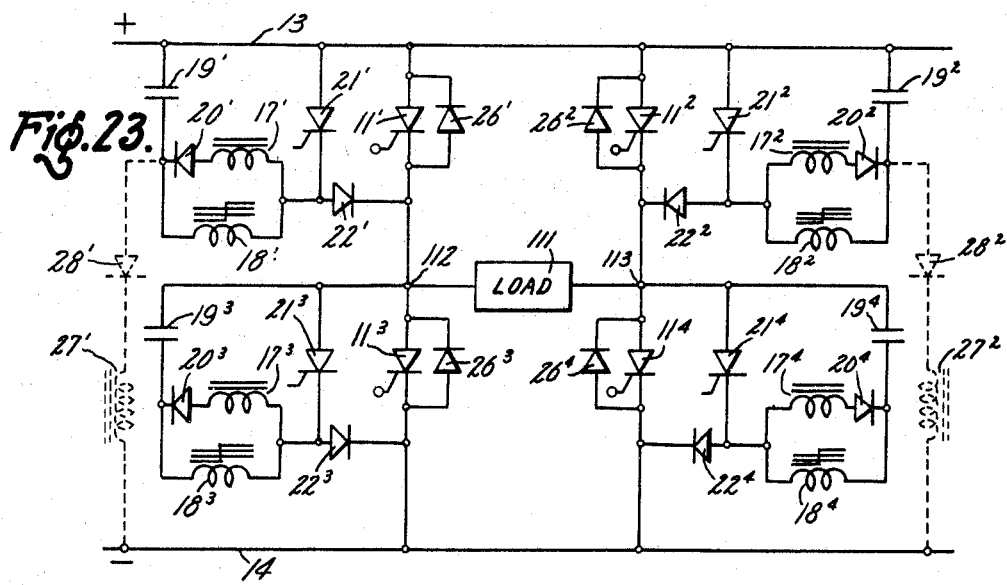
Inventor
Raymond E. Morgan
by Donald R. Campbell
His Attorney Inventor
Raymond E. Morgan
by Donald R. Campbell
His Attorney Inventor
Raymond E. Morgan
by Donald R. Campbell
His Attorney ns Patent Office 3,487,234
Patented Dec. 30, 1969

3,487,234
TIME RATIO CONTROL AND INVERTER POWER CIRCUITS
Raymond Evan Morgan, Schenectady, N.Y., assignor to General Electric Company, a corporation of New York
Original application Dec. 26, 1963, Ser. No. 334,690, now Patent No. 3,360,712, dated Dec. 26, 1967. Divided and this application Apr. 12, 1967, Ser. No. 630,346
Int. Cl. H03k 17/78
U.S. Cl. 307—252                                    21 Claims

ABSTRACT OF THE DISCLOSURE

A family of time ratio control D-C power circuits comprises a load current carrying SCR, triac, diac, or $dv/dt$ fired SCR which is turned on and commutated off at desired intervals to supply power to the load, which is connected in series with a filter inductance and in parallel with a coasting diode for inductive loads. The commutation circuit comprises a commutating capacitor in series with a parallel-connected linear inductance and saturable reactor and with an auxiliary SCR-diode combination or triac. The capacitor-linear inductance are tuned to series resonance at a frequency substantially lower than the commutating frequency, while the capacitor-saturable reactor are tuned to series resonance at the commutating frequency. For power generating loads, a coasting-feedback triac, diac, or $dv/dt$ fired SCR is connected in parallel with the load and a bidirectional load current carrying device is used to return power to the supply and thereby provide a second mode of operation for the circuit. Inverters employ two cooperating pairs of circuits.

This is a division of application Ser. No. 334,690 filed Dec. 26, 1963 now Patent No. 3,360,712, and assigned to the same assignee as the present invention.

The present invention relates to a family of new and improved power circuits employing new controlled turn on conducting devices and a new and improved commutation scheme.

More particularly, the invention relates to a family of power circuits employing turn on, non-gate turn off solid state semiconductor control devices for power switching purposes, time ratio control of direct current electric power or for inversion of direct current electric power to alternating current electric power. By time ratio control of direct current electric power is meant the chopping up of a direct current electric potential by controlling the on time of a turn on, turn off power switching device connected in circuit relationship with a load and the direct current electric potential. By inversion of direct current electric power to alternating current electric power is meant the switching of a load across alternate output terminals of a direct current electric supply by appropriately switching turn on, turn off power switching devices connecting the load in circuit relationship with the direct current electric supply.

In recent years the turn on, turn off power switching devices employed in the above described types of power circuits for the most part have employed a solid state semiconductor device known as a silicon controlled rectifier (SCR). The SCR is a four layer PNPN junction device having a gating electrode which is capable of turning on current flow through the device with only a relatively small gating signal. The conventional SCR, however, is a non-gate turn off device in that once conduction through the device is initiated, the gate thereafter loses control over conduction through the device until it has been switched off by some external means. Such external means are generally referred to as commutation circuits, and usually effect turning off of the SCR by reversal of the potential across the SCR. In addition to the SCR, recent advances in the semiconductor art have made available to industry new solid state semiconductor devices which are controlled turn on, non-gate turn off conducting devices, but which are bi-directional conducting devices. By bi-directional conducting device is meant the device is capable of conducting electric current in either direction through the device. One of these last mentioned devices, referred to as a "Triac," is a gate controlled turn on NPNPN junction device which, similar to the SCR, is a non-gate turn off device that must be turned off by external commutation circuit means. While the preferred form of triac is a five-layer gate controlled device, it should be noted that four-layer PNPN and NPNP junction gate control triac devices are practical as well as other variations, but that in any event the triac characteristics mentioned above are common to all of them. The second newly available power device, referred to as a "power diac" is a two terminal, five layer NPNPN junction device which like the triac has bi-directional conducting characteristics. In contrast to the SCR and triac, however, the diac is not a gate turn on device, but must be turned on by the application of a relatively steep voltage pulse (high $dv/dt$) applied across its terminals. It should be noted that SCR and triacs may also be fired by the same high $dv/dt$ technique. However, the diac is similar to the SCR and triac in that it too must be turned off by external circuit commutation means. The present invention provides new and improved power circuits employing solid state semi-conductor devices of the above general type as well as a new and improved commutation scheme for use with such devices. It is therefore a primary object of the present invention to provide an entire family of new and improved power circuits employing controlled turn on, non-gate turn off conducting devices.

Another object of the invention is to provide a new and improved commutation scheme for power circuits employing controlled turn on, non-gate turn off conducting devices which allows for a reduction in the size of components employed in the circuit for a given power rating, and hence is economical to manufacture.

A further object of the invention is the provision of such a new and improved commutation scheme which is economical and efficient in operation, and which provides reliable commutation that is independent of load from no load to full load operating conditions.

In practicing the invention, new and improved power circuits are provided using controlled turn on, non-gate turn off solid state semi-conductor devices. These new and improved power circuits include in combination a load current carrying turn on, non-gate turn off controlled conducting device and a load effectively coupled in series circuit relationship across a pair of power supply terminals that in turn are adapted to be connected across a source of electric potential. Turn on gating and firing circuit means are provided for controlling the turn on of the controlled conducting devices, and commutation circuit means are provided for commutating off the devices at desired intervals. The commutation circuit means preferably comprises a linear inductance and a saturable reactor effectively connected in parallel circuit relationship, the saturated inductance of the saturable reactor being substantially less than the inductance of the linear inductance. A commutating capacitor is connected between one juncture of the parallel connected linear inductance and saturable reactor and one terminal of the load current carrying turn on, non-gate turn off controlled conducting device. The commutating capacitor and the linear inductance are tuned to series resonance at a substantially lower frequency than a desired commutating frequency, and the commutating capacitor and the saturated inductance of the saturable reactor are tuned to series resonance at the desired commutating frequency. Means are provided including an auxiliary controlled turn on conducting device which is operatively connected between the remaining juncture of the parallel connected linear inductance and saturable reactor and one of the terminals of the load current carrying turn on, non-gate turn off controlled conducting device for circulating the charge on the commutating capacitor through a closed series circuit loop including the linear inductance and thereby reverse the polarity of the charge on the commutating capacitor. Means are also provided which include the saturable reactor for coupling the reverse polarity charge on the commutating capacitor across the load current carrying turn on, non-gate turn off controlled conducting device to commutate it off.

Other objects, features and many attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a detailed circuit diagram of a new and improved time ratio control power circuit employing a new and improved commutation scheme made possible by the present invention;

FIGURE 2 is an equivalent circuit representation illustrating the time-ratio control principle together with a series of curves depicting the form of variable voltage direct current electric energy derived from time ratio control power circuits;

FIGURE 3 is an equivalent circuit diagram of a time-ratio control circuit illustrating the effect of a coasting rectifier and filter inductance added to the equivalent circuit of FIGURE 2;

FIGURE 4 is a detailed circuit diagram of a new and improved time ratio control circuit similar to that in FIGURE 1, but modified to provide improved features of operation, and employing conventional gate controlled silicon control rectifier solid state devices;

FIGURE 5 is a series of voltage versus time characteristic curves illustrating the operation of the circuit shown in FIGURE 4;

FIGURE 6 is a detailed circuit diagram of a modification of the circuit of FIGURE 4, and illustrates a means for obtaining independent charging of the commutating capacitor employed in that circuit;

FIGURE 12 is a detailed circuit diagram of a new and improved time-ratio control circuit employing a $dv/dt$ fired SCR and the new and improved commutation scheme comprising a part of the present invention;

FIGURE 13 is a modification of the circuit shown in FIGURE 12 which uses a bi-directional conducting diac in place of the $dv/dt$ fired SCR, and a bi-directional conducting triac in place of the auxiliary SCR and coupling diode, and in addition illustrates a different form of firing circuit means for turning on a diac or $dv/dt$ fired SCR;

FIGURE 14 is a detailed circuit diagram of still a different form of firing circuit means for turning on a diac which uses common circuit elements to turn on the diac to conduct current in either one of two opposite directions;

FIGURE 15 is a modification of the circuit shown in FIGURE 14 which provides independent control of the turn on of the bi-directional conducting diac in either direction;

FIGURE 18 is a modification of the time ratio control power circuit shown in FIGURE 16 with the exception that a convential gate fired SCR is substituted for the load current carrying diac of FIGURE 16;

FIGURE 19 is a modification of the time ratio control power circuit shown in FIGURE 11 with the exception that a bi-directional conducting diac is substituted for the coasting and feedback triac of FIGURE 11;

FIGURE 22 is a modification of the time ratio control power circuit shown in FIGURE 11 with the exception that a coasting diode is substituted for the coasting and feedback triac of FIGURE 11;

FIGURE 23 is a detailed circuit diagram of a new and improved inverter circuit employing the new and improved commutation scheme made possible by the present invention, and which uses conventional gate fired SCRs;

Figure 7:
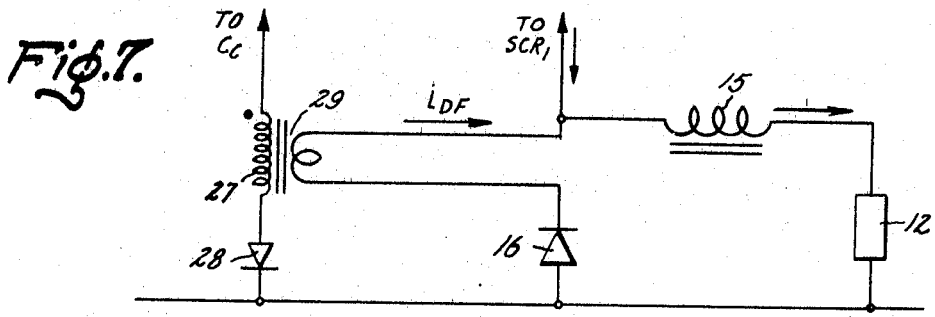
FIGURE 7 is a detailed circuit diagram of a modification of the circuit shown in FIGURE 6, and illustrates a means for obtaining charging of the commutating capacitor to a value dependent upon the value of the load current.

The new and improved time ratio control power circuit illustrated in FIGURE 1 of the drawing is comprised by a gate turn on, non-gate turn off solid state silicon controlled rectifier device 11 and a load 12 effectively coupled in series circuit relationship across a pair of power supply terminals 13 and 14 which in turn are adapted to be connected across a source of electric potential. In the particular embodiment of the invention shown in FIGURE 1, the source of electric potential is a direct current power supply having its positive potential applied to the terminal 13 and its negative potential applied to the terminal 14. It should be noted that while the TRC circuits herein disclosed are drawn in connection with direct current power supplies, with very little modification these circuits could be used to chop out any desired portion of a half cycle of applied alternating current potential. A filter inductance 15 is connected in series circuit relationship intermediate the SCR 11 and load 12 and a coasting diode 16 is connected in parallel circuit relationship with the filter inductance 15 and load 12.

Commutation circuit means are provided for turning off the SCR 11 which comprises a linear inductance 17 and a saturable reactor 18 effectively connected in parallel circuit relationship. The saturable reactor 18 is designed in such a manner that its saturated inductance is substantially less than the inductance of the linear inductance 17. For best operation of the circuit in most applications, it is desirable that a blocking diode 20 be connected in series circuit relationship with the linear inductance 17, and that saturable reactor 18 be connected in parallel with the series connected linear inductance 17 and blocking diode 20. A commutating capacitor 19 is interconnected intermediate one juncture of the parallel connected linear inductance 17 and saturable reactor 18 and the terminal 13 so that in effect the capacitor is electrically connected to the positive terminal of the SCR 11. The commutator capacitor 19 and the linear inductance 17 form a series circuit which is turned to series resonance at a frequency which is substantially lower than the desired commutating frequency. The commutating capacitor 19 and the saturated inductance of saturable reactor 18 likewise will be tuned to series resonance but at the desired commutating frequency which is substantially higher than the resonant frequency of linear inductance 17 and the commutating capacitor 19. Means are provided which include an auxiliary turn on controlled conducting device which is operatively connected between the remaining juncture of the parallel connected linear inductance 17 and saturable reactor 18 and the above mentioned terminal 13 which in effect is connected to the positive terminal of the SCR 11. In the embodiment of the invention shown in FIGURE 1 the auxiliary turn on controlled conducting device constitutes a second gate turn on, non-gate turn off solid state silicon controlled rectifier device 21 which serves to circulate the charge on the commutating capacitor 19 through a closed series circuit loop which includes the linear inductance 17, the additional or auxiliary SCR 21 and of course the commutating capacitor 19. By means of this connection, the polarity of the charge on the commutating capacitor 19 is reversed. The power circuit of FIGURE 1 is completed by means comprising a coupling diode 22 having its negative electrode connected to the negative electrode of the SCR 11 and its positive electrode connected to the remaining juncture of the parallel connected linear inductance 17 and saturable reactor 18. By reason of this connection, the reverse polarity charge on the commutating capacitor 19 will be coupled through the saturable reactor 18 upon that reactor saturating, and through the coupling diode 22 to apply a reverse polarity potential across the SCR 11 to thereby commutate it off. Properly phased gating on signals are applied to the gating electrodes of the SCRs 11 and 21 from a suitable gating signal control circuit such as that shown in FIGURE 8 of the drawings for gating on the SCR's in properly timed sequence as explained hereinafter.

In operation, if it is assumed that initially the load current carrying SCR 11 is in its non-conducting or blocking state, then the commutating capacitor 19 will be charged through the load 12, filter inductance 15, diode 22 and saturable reactor 18 to essentially the full potential of the direct current power supply connected across the terminals 13 and 14. This charge will be positive at the terminal 13 and negative at the juncture of the linear inductance 17 and saturable reactor 18. In the process of charging the commutating capacitor 19, the saturable reactor 18 is driven into negative saturation and the potential across it is positive at dot end of the reactor. The circuit thereafter remains in this condition until such time that the gating on signal is applied to the gating on electrode of the SCR 11. Upon this occurrance, the diode 22 blocks, and the charge on the commutating capacitor 19 is retained. Current supplied through the conducting SCR 11 is supplied through the filter inductance 15 and load 12 back to the direct current power supply. The SCR 11 will be allowed to remain conducting for a time period dependent upon the amount of current to be supplied to the load 12, and then will be commutated off in the manner of a time ratio control power circuit.

The theory of operation of time ratio power control is best illustrated in FIGURE 2 of the drawings wherein an on-off switch 23 is shown connected in series circuit relationship with a load resistor 24 across a direct current power supply. With the arrangement of FIGURE 2 there are two possible types of operation in order to supply variable amounts of power to the load resistor 24. These two types of operation are to leave the switch 23 closed for a fixed period of time, and vary the time that the switch is open. This type of operation is illustrated in curves 2A wherein curve 2A(1) illustrates a condition where the switch 23 is opened for only a short period of time compared to the time it is closed to provide an average voltage across the load resistor 24 equal to about ¾ of the supply voltage $E_s$ of the direct current power supply. In FIGURE 2A(2) the condition is shown where the switch 23, is left open for a period of time equal to that during which it is closed. Under this condition of operation the voltage across the load will equal approximately 50 percent of the supply voltage $E_s$. FIGURE 2A(3) illustrates the condition where the switch 23 is left open for a period of time equal to twice that for which the switch is closed so that the load voltage appearing across the load resistor 24 will be equal to about 25% of the supply voltage $E_s$. In any event, it can be appreciated that by varying the period of time during which the switch 23 is left open the amount of direct current potential applied across the load 24 is varied proportionally.

In the second type of operation possible with time ratio control power circuits, the amount of time that the SCR 11 in the circuit of FIGURE 1 is left in its turned off or blocking condition can be varied to vary the load current through the load 12 proportionally. This second type of operation of the circuit shown in FIGURE 2 is illustrated in FIGURE 2B of the drawings wherein the amount of time that the switch 23 is closed is varied. In FIGURE 2B(1) the condition where the switch 23 is closed for a much greater period of time than it is open, is illustrated to provided a load voltage $E_L$ of approximately .75 $E_s$. In FIGURE 2B(2) the time that switch 23 is closed equals the time that it is open to produce a load voltage $E_L$ is equal to .5 $E_s$. In FIGURE 2B(3) the condition where the switch 23 is left closed for a period of time equals about ½ the time that switch 23 is open to provide a load voltage $E_L$ equal to .25 $E_s$. It can be appreciated, therefore, that by varying the period of time that the switch 23 is left closed, the amount of voltage supplied across the load resistor 24 can be varied proportionally in a similar fashion to that described above with respect to switch 23, by varying the period of time that the SCR 11 of the circuit shown in FIGURE 1 either is in a conducting condition or a nonconducting condition, the power supplied to the load 12 can be varied proportionally. It is a matter of adjustment of the phasing of the gating control signals supplied to the control gates of the SCR 11 and the SCR 21 which determines the amount of time that the SCR 11 is either conducting or not conducting. This of course in turn determines the power supplied to the load 12 in the manner described with relation to FIGURE 2. Whether the amount of time that the SCR 11 is in its blocking condition, is varied, or whether the amount of time that the SCR 11 is conducting, is varied to provide such proportionally controlled power to the load 12 usually depends upon the load in question, but in so far as the principles of commutation to be described hereinafter are concerned, it does not matter which type of operation is employed.

FIGURE 3 of the drawings better depicts the nature of the output signal or voltage $E_L$ developed across the load resistor 12 by the circuit shown in FIGURE 1. In FIGURE 3, the SCR 11 is again depicted by the on-off switch 23, and the voltage or current versus time curves for the various elements of this circuit are illustrated in FIGURE 3B. FIGURE 3B(1) illustrates the voltage versus time characteristic of the potential $E_{DF}$ appearing across the coasting diode 16. It is to be noted that the potential $E_{DF}$ is essentially a square wave potential whose period is determined by the timing of the switch 23. For the period of time that the switch 23 is closed, a load current $I_L$ flows through the filter inductance 15 and load 12 back into the power supply. On the switch 23 being opened (which corresponds to the SCR 11 being commutated off to its blocking or non-conducting condition), the energy trapped in the filter inductance 15 will try to produce a coasting current flow in a direction such that it will be positive at the dot end of the filter inductance. This energy which is directly coupled across the coasting diode 16, causes the diode 16 to be rendered conductive, and to circulate a coasting current substantially equal to the load current $I_L$ through the load 12 and coasting diode 16 thereby discharging the filter inductance 15. As a consequence, the load voltage $E_L$, and for that matter the load current $I_L$, will appear substantially as shown in FIGURE 3B(2), of the drawings as an essentially steady state value lower than the source voltage $E_s$ by a factor determined upon the timing of the on-off switch 23. This load voltage can be calculated from the expression shown in FIGURE 3. This expression states that the load voltage $E_L$ is equal to the time that switch 23 is closed divided by time that switch 23 is closed plus the time switch 23 is open all multiplied by the power supply voltage $E_s$. The current $I_s$ supplied through switch 23 to the filter inductance 11 is illustrated in FIGURE 3B(3) of the drawing, and is essentially a square wave potential having the same period as the voltage $e_{DF}$. It should be noted that upon the next succeeding cycle of operation when the switch 23 is closed, the filter inductance 15 will again be charged in a manner such that when it discharges upon switch 23 being opened, its potential is positive at the dot end so that the coasting rectifier 16 is again rendered conductive, and discharges the filter inductance through the load 12 to provide the essentially continuous steady state load voltage $E_L$ shown in FIGURE 3B(2).

Coming back now to FIGURE 1 of the drawings, it can be appreciated that the timing of SCR 11 being switched on and commutated off determines essentially the load voltage $E_L$ supplied across the load 12 in the manner discussed in connection with FIGURE 3 of the drawings. In order to commutate off the SCR 11, the new and improved commutation circuit means comprised by the elements 17 through 22 has been provided. The new and improved commutation circuit means operates in accordance with the techniques of some presently known commutation circuits but accomplishes the commutation operation in an equally efficient and reliable manner with smaller components. One of these known commutation techniques employs a commutating capacitor connected in series circuit relationship with a saturable reactor across the SCR to commutate off the SCR. Another of the known commutation techniques employs a commutating capacitor, a series connected linear inductance which is tuned to series resonance with the commutating capacitor at the desired commutating frequency, and an auxiliary SCR used to reverse the charge across the commutating capacitor and hence commutate off the main load current carrying SCR. The manner of operation of each of these previously known commutation techniques will be briefly discussed in order to appreciate better the operation of the new and improved commutation circuit means shown in FIGURE 1.

The first known commutation technique to be described will be that known as "McMurray commutation," and employs a tuned commutating capacitor and linear inductance and auxiliary SCR. During this portion of the description of McMurray commutation, the saturable reactor 18 and blocking diode 20 should be ignored as if they were not present in the circuit, and it is assumed that the tuned L-C network resonates at the desired commutating frequency. Assuming these conditions then, and that the SCR 11 is initially in its off or blocking condition, the commutating capacitor 19 will be charged to essentially the full potential of the direct current power supply through the series circuit comprised by load 12, filter inductance 15, coupling diode 22 and linear inductance 17. Thereafter, upon the SCR 11 being rendered conductive, the potential of the point 25 (which is essentially the potential of the cathode of the SCR 11 and shall be termed $E_K$) goes immediately to the potential of the positive terminal 13. Upon this occurrence the diode 22 is rendered blocking so that the charge on the commutating capacitor 19 which is negative at the dot (.) side of the capacitor at this point in the operating cycle, is trapped. Thereafter, some precalculated number of microseconds prior to the time that it is desired to commutate off the load current carrying SCR 11, the auxiliary SCR 21 is turned on by the application of a gating signal to its gate. The charge on the commutating capacitor 19 then oscillates 180° in a sinusoidal fashion through the series tuned linear inductance 17 and conducting auxiliary SCR 21 to reverse the polarity of charge on the commutating capacitor 19 so that it now becomes positive at the dot side of the capacitor. This action results in driving the positive electrode of the coupling diode 22 positive with respect to the point 25 so that it is rendered conductive, and in turn drives the point 25 to a positive potential essentially twice that of the supply voltage $E_s$. This is due to the fact that the commutating capacitor 19 is in effect operatively coupled to the point 25 in series with the supply potential $E_s$. Since the potential across the commutating capacitor 19 is essentially equal to that of the supply voltage $E_s$ less any losses occasioned by the oscillation through the tuned L-C network and auxiliary SCR, the point 25 tries to go positive with respect to terminal 13 due to the impedance of filter inductance 15, thereby resulting in a reversal of the polarity of the potential across SCR 11 and causing it to be rendered non-conductive. The period of time that this condition is maintained is determined by the time required for the charge on the commutating capacitor 19 to leak off through the filter inductance 15 and load 12, and is sufficiently long to return SCR 11 to its blocking condition. Concurrently with SCR 11 being returned to its blocking condition the auxiliary SCR 21 likewise will be turned off, and returned to its blocking condition so as to condition the circuit for a new cycle of operation.

Considering now the second known commutation scheme known as the Morgan Circuit (after the present inventor), this known scheme utilizes a saturable reactor 18, and commutating capacitor 19, while ignoring the linear inductance 17, the blocking diode 20, the auxiliary SCR 21, and coupling diode 22, and assumes that the no dot end of the saturable reactor 18 is connected directly to the point 25. With such a commutation circuit, and with the SCR 11 turned off, the commutating capacitor 19 would be charged to essentially the full supply voltage $E_s$ through the circuit including load 12, filter inductance 15, and saturable reactor 18. In thus charging the commutating capacitor 19, the saturable reactor 18 would be driven into positive saturation so that the voltage across the saturated reactor is positive at the dot end. Thereafter, upon the SCR 11 being rendered conductive by its gating control circuit, the point 25 goes positive with respect to the dot end of the saturable reactor 18 so that saturable reactor 18 is driven out of positive saturation towards negative saturation. During the period of time that the saturable reactor 18 is unsaturated, it will hold off the potential of the commutating capacitor 19 so that the commutating capacitor 19 stays fully charged to essentially the full potential of the supply voltage $E_s$. The period of time that the saturable reactor 18 remains unsaturated is a matter of design of the saturable reactor. Hence, in the Morgan commutation circuit under consideration, the saturable reactor really performs a timing function for determining how long the SCR 11 remains conductive. Accordingly, the charge on the commutating capacitor 19 is maintained until such time that the saturable reactor 18 is driven into negative saturation so that the potential across the reactor 18 is negative at the dot end. The saturable reactor also is designed so that its saturated inductance and the commutating capacitor 19 are tuned to series resonance at the desired commutating frequency. Hence upon reaching negative saturation the charge on the commutating capacitor 19 is oscillated 180° in a sinusoidal manner through the inductance of the saturated reactor back through the conducting SCR 11 to reverse the polarity of the charge on the commutating capacitor 19 so that it becomes positive at the dot side. The effect is to again reverse the polarity of the potential across the saturable reactor 18 so that saturable reactor 18 again is driven out of negative saturation back towards positive saturation. Hence for the period of time required for the saturable reactor 18 to again reach positive saturation the reverse polarity charge on the commutating capacitor 19 is maintained, and the SCR 11 continues to conduct. Upon the commutating saturable reactor 18 reaching positive saturation so that the potential across it is again positive at the dot end, the impedance of the saturable reactor essentially drops to zero. The reverse polarity charge on commutating capacitor 19 then is effectively coupled across the SCR 11 in the manner previously described in connection with the tuned linear inductance commutating capacitor auxiliary SCR type of McMurray commutation described above. This condition will be maintained for the period of time required for the reverse polarity charge to leak out through the saturated reactor 18, filter inductance 15, and load 12, and is a sufficient period of time to return the SCR 11 to its blocking condition. Upon this occurrence, commutating capacitor 19 will then again be recharged to the potential of the direct current power supply, and the circuit is conditioned for a new cycle of operation. For a more detailed description of the "Morgan Circuit" commutation scheme reference is made to U.S. Patent No. 3,019,355 entitled "Magnetic Silicon Controlled Rectifier Power Amplifier," R. E. Morgan, inventor, issued Jan. 30, 1962.

Consider now the operation of the new and improved time ratio control power circuit shown in FIGURE 1 of the drawings, and assume that the load current carrying SCR 11 and auxiliary SCR 21 are turned off. With the circuit in this condition, the commutating capacitor 19 will be charged through the series circuit comprised by load 12, filter inductance 15, coupling diode 22, and saturable reactor 18 to essentially the full potential of the direct current power supply $E_s$. In this charging operation the saturable reactor 18 will be driven into positive saturation so that the potential across the reactor 18 is positive at the dot end. Thereafter, upon the load current carrying SCR 11 being gated on by its gating control circuit, load current will be supplied to load 12 through filter inductance 15. Upon the SCR 11 being rendered conductive, the point 25 goes to essentially the potential of the positive bus bar 13 causing diode 22 to block, and thereby retaining the charge on the commutating capacitor 19. The circuit remains in this condition for the period of time that the SCR 11 is allowed to conduct as determined by the time ratio control principles described in connection with FIGURES 2 and 3.

Just prior to the time that the SCR 11 is to be commutated off, the auxiliary SCR 21 is turned on. Upon the auxiliary SCR 21 being turned on, the charge on commutating capacitor 19 is oscillated 180° in a sinusoidal fashion through the blocking diode 20 (if present in the circuit), series tuned linear inductance 17, and conducting auxiliary SCR 21 so as to reverse the polarity of the charge across the commutating capacitor 19. This results in reversing the charge on commutating capacitor 19 and makes it positive at its dot side with respect to the terminal 13. With the circuit in this condition, the blocking diode 20 will block thereby preventing dissipation of the charge on commutating capacitor 19 through the linear inductance 17. In addition to this function, blocking diode 20 prevents ringing oscillations between linear inductance 17 and saturable reactor 18. It should be noted that if the blocking diode 20 is not used, and this is possible for some applications, some leakage of the reversed polarity charge on capacitor 19 will take place through linear inductance 17. However linear inductance 17 is so much larger than the saturable reactor 18 that this leakage will not seriously affect operation of the circuit in an adverse manner. Use of the blocking diode 20 is preferred, however.

Concurrently with the reversal of the polarity of the charge on the commutating capacitor 19, the current flowing through the auxiliary SCR 21 splits and part of it drives the saturable reactor 18 out of positive saturation toward negative saturation while the bulk of it reverses the polarity of the charge on capacitor 19. During the interval of time that the saturable reactor 18 is unsaturated while it goes from positive saturation toward negative saturation, the charge on the commutating capacitor 19 will be held off, and the SCR 11 as well as the auxiliary SCR 21 continue to conduct. Sometime during this interval, however, the polarity of the charge on capacitor 19 will have been reversed by the lower impedance path through inductance 17. Upon this reversal of potential the saturable reactor 18 will be driven back toward positive saturation. As a consequence, the saturable reactor 18 will remain unsaturated for an interval of time equal to that during which it was being driven toward negative saturation, and then again will be driven into positive saturation. Upon saturable reactor 18 again reaching positive saturation the reverse polarity charge on the commutating capacitor 19 will be coupled through the essentially zero impedance of the saturated reactor 18 and coupling diode 22 to drive the point 25, and therefore the potential $e_K$ to a positive potential substantially equal to twice the value of the supply voltage terminal 13. This results in reversing the polarity of the potential across both the SCRs 11 and 21, and causes them to be turned off. This condition is maintained for the period of time required for the charge on the commutating capacitor 19 to leak off through the saturated reactor 18, filter inductance 15, and load 12. This period of time is, of course designed to allow a sufficient period of time to assure the SCRs 11 and 21 return to their blocking condition thereby conditioning the circuit for a new cycle of operations.

It should be noted that during most of the commutation period described above, load current required by the load and filter inductance 15 is supplied through the load current carrying SCR 11 and need not be supplied through the auxiliary SCR 21 which serves only to reverse the polarity of the charge on the commutating capacitor 19. Since this reversal of charge occurs at a much lower frequency than the commutating frequency, and hence extends over a greater time period than the commutation interval, the auxiliary SCR 21 can be much smaller than that required for the tuned L-C, auxiliary SCR commutation scheme alone. Similarly, the size of the saturable reactor 18 can be greatly reduced over the size of a saturable reactor required if a commutating capacitor and saturating reactor alone were used for commutation of the load current carrying SCR 11. As a consequence, a very considerable saving in the cost of the components of the commutation circuit is accomplished by reason of the new circuit configuration. In addition to these features, the circuit is highly efficient in operation since the commutating energy is not dissipated but is recirculated, and then supplied to the load. As a consequence, the circuit is efficient and economical in operation, and provides reliable commutation.

FIGURE 4 of the drawings illustrates a modification of the circuit shown in FIGURE 1 of the drawings, and is preferred for applications where the load 12 being supplied is inductive in nature. The circuit of FIGURE 4 differs from the circuit of FIGURE 1 by the addition of a feed back dode 26 connected across the load current carrying SCR 11 in a verse polarity sense. By the inclusion of the feed back diode 26, when the potential $e_K$ at the point 25 tries to go positive with respect to the terminal 13, feed back diode 26 conducts, and clamps the potential of the point 25 to the potential of the terminal 13. As a result, current will be supplied back to the direct current power supply through the feed back diode 26, and, hence, it is sometimes referred to as a pump back diode. Because the potential at the point 25 therefore is clamped to the potential of the terminal 13 by feed back diode 26, the mode of commutation of SCRs 11 and 21 in the FIGURE 4 is somewhat different than the circuit of FIGURE 1. In the circuit arrangement of FIGURE 4, a reverse bias is developed across the SCRs 11 and 21 by reason of the forward voltage drop across the feed back diode 26. This voltage drop may be no more than 1 volt but it is sufficient to reverse the polarity of the potential across the SCRs 11 and 21, and causes them to turn off and return to their blocking condition.

FIGURE 5 of the drawing is a series of potential versus time and current versus time characteristic curves illustrating the nature of the potentials and currents at different points in the power circuit of FIGURE 4. FIGURE 5A illustrates the potential $e_K$ at point 25, and shows how it is clamped at essentially the power supply potential by feed back diode 26 during the commutation off of SCR 11 during the interval c–d of FIGURE 5B. FIGURE 5B illustrates the potential across the commutating capacitor 19 where it is shown that just prior to the time that the auxiliary SCR 21 is turned on, the potential $E_c$ across the commutating capacitor 19 is negative during the time interval before point $a$. The time at which the auxiliary SCR 21 is turned on, corresponds to point $a$ in FIGURE 5B and 5C, and the charge on commutating capacitor 19 then is oscillated 180° through inductance 17 over the time period $abc$ to reverse the polarity of the charge on commutating capacitor 19. Thereafter, over the time period $cde$ the reverse polarity charge on capacitor 19 drives saturable reactor 18 back into positive saturation, and turns off the SCRs 11 and 21. Turn off of SCRs 11 and 21 is essentially accomplished during the time interval $cd$, and during the interval of time $de$, the commutating capacitor 19 is recharged to the value of the supply potential as shrown in FIGURES 5B and 5F. FIGURE 5E of the drawings illustrates the current $i_R$, flowing in the tuned L-C circuit comprised by commutating capacitor 19 and linear inductance 17 during the reversal of the charge on commutating capacitor 19. FIGURE 5F of the drawings illustrates the commutation current $i_C$ flowing out of the commutating capacitor 19 during the interval $cde$, reaching a maximum at time $d$ when the saturable reactor reaches saturation, and provides a pulse of current extending over a 20 microseond period which is the required time for most SCRs to assume a blocking condition. In curve 5D, the voltage across saturable reactor $e_{SR}$ is shown, and it can be seen that the energy under the portion of the curve $ab$ which is required in driving saturable reactor 18 out of positive saturation towards negative saturation, equals the energy under the portion of the curve $bc$ required to drive the unsaturated reactor back into positive saturation.

FIGURE 6 of the drawing illustrates a modification of the circuit shown in FIGURE 4, and provides a means for assuring that the commutating capacitor 19 will be properly charged under all conditions of loading. Such assurance may be required because of the characteristics of a particular load 12 draws only very low load currents. This occurs where the load current may vary from no load to about 10% of full load. In order to insure that the commutating capacitor 19 will be properly charged for each commutating interval under such operating conditions, a charging inductance 27 and a charging diode 28 are connected in series circuit relationship between the negative power supply terminal 14 and the juncture of the commutating capacitor 19 with saturable reactor 18 and blocking diode 20. By this arrangement, the charging inductance 27 provides the energy to complete the recharging of the commutating capacitor 19 at the end of each commutating operation. During the commutating interval, the charging inductance 27 (which incidentally is considerably larger than the tuned inductance 17) stores energy equal approximately to ½ $L_{27}.(L_{27})^2$ while the voltage across the inductor 27 is positive at the dot end. This occurs after the first reversal of the charge on commutating capacitor 19 and the dot side of capacitor 19 is positive. At the end of the commutation interval, the charging diode 28 blocks, and inductor 27 discharges into the commutating capacitor to charge it to a value greater than the supply voltage $E_s$. With the charge on the commutating capacitor being greater than the supply potential, and the dot side of the commutating capacitor being negative, the diode 22 will stay blocked, and the charge on the commutating capacitor will be maintained. The inductor 27 is designed to discharge an amount of energy during the commutation interval which is equal to the losses in the commutating circuit for one commutating period. The cost in size, weight, and economy of operation made possible by the additional charging inductance 27 and charging diode 28 are considered small for the improved performance obtained at no load to 10 percent of full load operation conditions.

FIGURE 7 of the drawings illustrates a modification of the circuit shown in FIGURE 6 wherein the charging inductance 27 is inductively coupled to a primary winding 29 that may comprise a single turn or two connected in the coasting diode circuit in series circuit relationship with the coasting diode 16, filter inductance 15, and load 12. As a consequence of the connection, load current will be circulated through the primary winding 29 which will facilitate charging the inductance 27, and hence, commutating capacitor 19, to a value dependent upon the value of the load current $I_L$. By this means, it is always assured that the commutating capacitor 19 will be charged to a value sufficient to assure commutation of the load current through SCR 11. If the load current $I_L$ is equal to zero, or is of a very low value, essentially no extra energy will be transformed to the commutating capacitor 19, and hence, the operation of the commutating circuit will be the same as that described in connection with FIGURE 6. As the load current $I_L$ varies from a value equal to or nearly zero to full load, the charge on the commutating capacitor varies accordingly, and assures proper commutation.

Figure 8:
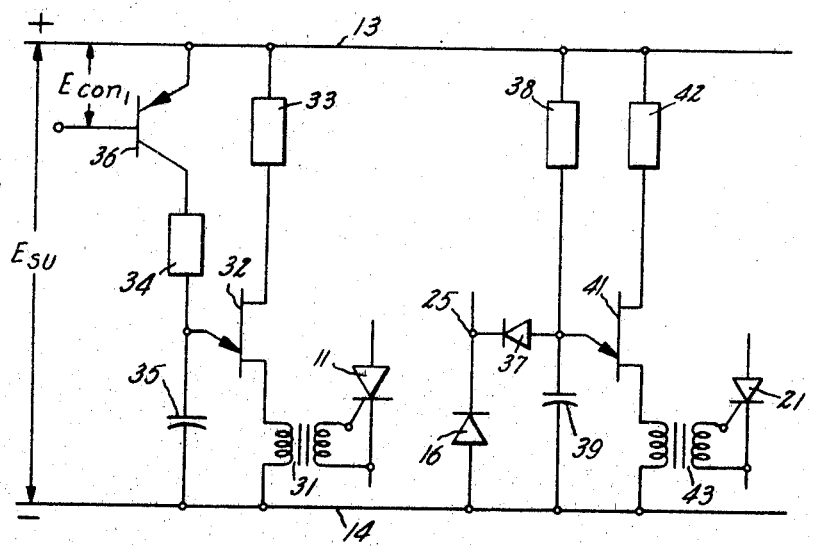
FIGURE 8 is a detailed circuit diagram of a suitable gating circuit for use with the time ratio control circuit showing in FIGURES 1, 4, 6, and 7.

FIGURE 8 of the drawings illustrates the construction of a gating circuit suitable for use with the new and improved power circuits shown in FIGURES 1, 4, 6 and 7. In FIGURE 8, a load current carrying silicon controlled rectifier device 11 is shown as having its gate electrode connected to the secondary winding of a pulse transformer 31. The primary winding of pulse transformer 31 is connected between one base of a unijunction transistor 32 and the negative terminal 14 of the direct current power supply. The remaining base of the unijunction transistor 32 is connected through a voltage limiting resistor 33 to the positive terminal of the direct current power supply. The emitter electrode of the unijunction transistor 32 is connected to the junction of a resistor 34 and capacitor 35 connected in series circuit relationship between the negative terminal 14 and the collector electrode of PNP transistor 36. The transistor 36 has its emitter electrode connected directly to the positive terminal 13, and its base electrode is connected to a source of control voltage for controlling the phasing of the time of firing of the load current carrying SCR 11.

In order to control the time of firing of an auxiliary SCR 21 at a fixed phase relationship with respect to the time of firing of the load current carrying SCR 11, the coasting rectifier 16 has its cathode connected to the cathode of a blocking diode 37. The coupling diode 37 in turn has its anode connected to the juncture of a resistor 38 and capacitor 39 connected in series circuit relationship across the terminals 13 and 14. The juncture of the resistor 38 and capacitor 39 is also connected to the emitter electrode of a unijunction transistor 41 which has one base connected through a resistor 42 to the positive terminal 13, and the remaining base connected through the primary winding of a pulse transformer 43 to the negative terminal 14. The secondary winding of the pulse transformer 43 is connected to the gate electrode of the auxiliary SCR 21.

By reason of the above-described arrangement, and the nature of the unijunction transistors 32 and 41, which are avalanche devices in that they are rendered fully conducting upon the base to emitter voltage of the device reaching a predetermined level, gating pulses will be produced in the primary windings of the pulse transformers 31 and 43 in the following manner. The control voltage applied to the base electrode of the PNP transistor 36 causes this transistor to vary the value of the resistance or resistance-capacitance network comprised by resistor-capacitor 34 and 35. This results in varying the rate at which the capacitor 35 is charged to a value sufficient to trigger on the unijunction transistor 32. Upon the unijunction transistor 32 being triggered on, a gating pulse will be produced in secondary winding of the pulse transformer 31 which turns on the load current carrying SCR 11. Upon the load current carrying SCR 11 being turned on, the point 25 is driven to the positive potential of terminal 13 so that the blocking diode 37 is rendered blocking. Upon the diode 37 being blocked the capacitor 39 will be charged up through the resistor 38 towards the potential of terminal 13 at a rate determined by the time constant of the resistor 38 and capacitor 39. This charging rate can be designed to provide a sufficient potential across the capacitor 39 at a predetermined time interval after load current carrying SCR 11 is turned on to cause the unijunction transistor 41 to be turned on. This results in producing a gating pulse in the secondary winding of the pulse transformer 43 to thereby turn on the auxiliary SCR 21 at the desired fixed interval of time after load current carrying SCR 11 was turned on.

Figure 9:
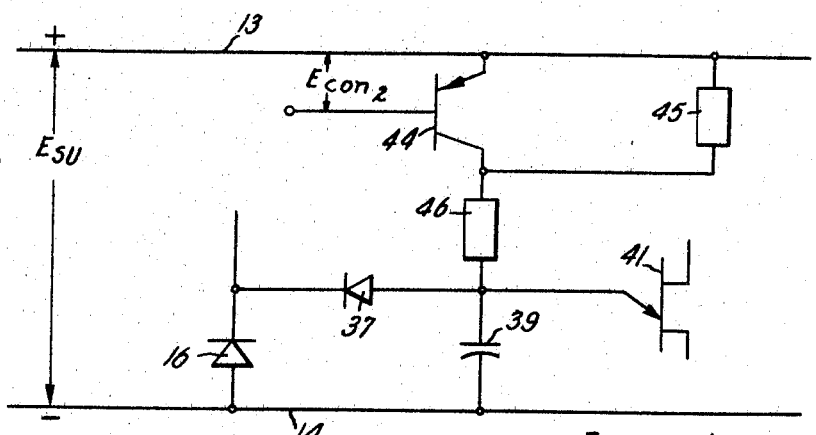
FIGURE 9 is a detailed circuit diagram of a modification of the gating circuit shown in FIGURE 8 to provide independent control over the commutation operation as well as independent control of turn on of the load current.

FIGURE 9 of the drawings illustrates a variation of the circuit shown in FIGURE 8 wherein independent control is provided over the firing of the auxiliary SCR. This independent control of the firing of auxiliary SCR 21 is achieved by the substitution of an additional PNP transistor 44 paralleled by a resistor 45, and connected in series circuit relationship with a resistor 46 in place of the fixed resistor 42 shown in FIGURE 7. By reason of this modification, variation of the conductance of the transistor 44 will operate to vary the resistance of the resistance network comprised by transistor 44, resistor 45, and resistor 46, to thereby vary the charging rate of the capacitor 39. This in turn varies the time, at which the unijunction transistor 41 is turned full on resulting in gating on the auxiliary SCR 21 with respect to the turn on time of the load current carrying SCR 11. If desired, other forms of suitable firing circuits for the power circuit arrangements herein described may be used, such as those disclosed in chapter 9 entitled "Inverter and Chopper circuits" of the Silicon Controlled Rectifier Manual published by the General Electric Company, Rectifier Components Department, copyrighted in 1961.

Figure 10:
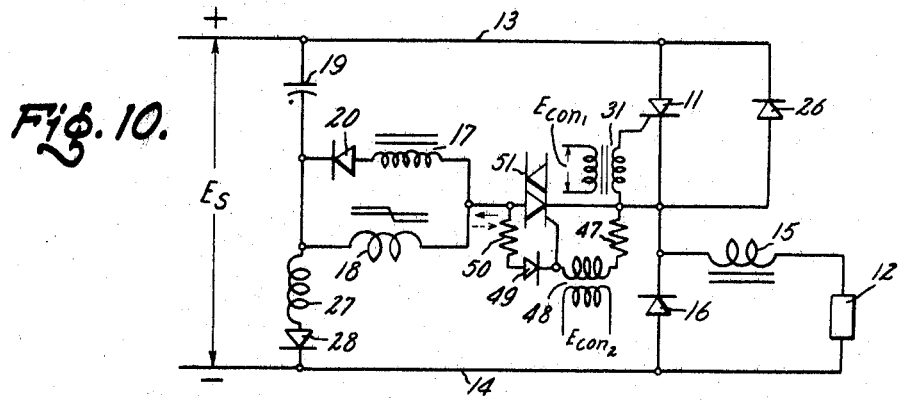
FIGURE 10 is a detailed circuit diagram of a modification of the circuit shown in FIGURE 6 which employs a triac in place of the auxiliary silicon control rectifier and coupling diode.

FIGURE 10 of the drawings illustrates a modification of the time ratio control power circuit shown in FIGURE 6 wherein the auxiliary SCR 21 and coupling diode 22 of the FIGURE 6 circuit arrangement are replaced by a single gate turn on, non-gate turn off solid state triac bi-directional conducting device 51. The triac 51 is a gate turn on, non-gate turn off, bi-directional conducting device which has been newly introduced to the electrical industry by the Rectifier Components Department of the General Electric Company, Auburn, N.Y. Similar to the SCR, the triac may be switched from a high impedance blocking state to a low impedance conducting state when a low voltage gate signal is applied between the gate terminal and one of the load terminals. Also, like the SCR, once the triac is switched to the low impedance conducting state, the gate electrode loses control and current flow through the device must be interrupted by some external means while the gate signal is removed in order to return the triac to its high impedance blocking state. A further characteristic of the triac 51 is that once it is gated on, it will conduct current through the device in both directions depending upon the polarity of the potential across the device. For a more detailed description of the triac gate turn on, non-gate turn off solid state semiconductor device, reference is made to the U.S. application Ser. No. 331,776 entitled "Semiconductor Switch," by F. W. Gutzwiller, inventor, filed Dec. 20, 1963, and assigned to the General Electric Company.

Gating circuit means are provided for switching triac 51 to its low impedance conducting state, and includes first gating circuit means to gate on the triac device 51 to cause it to conduct current when the potential of point 25 is positive with respect to the dot side of commutating capacitor 19. This first gating circuit means includes a limiting resistor 47 and the secondary winding of a gating pulse transformer 48 connected in series circuit relationship between the control gate of triac 51 and point 25 which is at the same potential as the negative terminal of load current carrying SCR 11. In order to turn on triac 51 when the potential of the dot side of commutating capacitor 19 is positive with respect to point 25, the gating circuit means includes a second gating circuit comprised by a coupling diode 49 and limiting resistor 50 connected in series circuit relationship between the control gate of triac 51 and the remaining juncture of the parallel connected linear inductance and saturable reactor opposite that to which the commutating capacitor 19 is connected. To operate properly, the anode of diode 49 must be effectively connected to the last mentioned remaining juncture, and the cathode of diode 49 effectively connected to the control gate of triac 51.

In operation the circuit of FIGURE 10 will function in much the same manner as the circuit of FIGURE 6. During the interval when the load current carrying SCR 11 is turned off, the commutating capacitor 19 is charged to a potential greater than the direct current power supply by inductance 27 in the previously described manner. Thereafter, upon the load current carrying SCR 11 being turned on, the triac 51 (which at this point is in its blocking condition) prevents the charge on capacitor 19 from being dissipated through load 12. At some predetermined time interval prior to the time for turning off the load current carrying SCR 11, a gating on signal is applied to the triac 51 by gating pulse transformer 48. Upon this occurrence, the charge on commutating capacitor 19 is oscillated through the linear inductance 17, blocking diode 20, triac 51, and load current carrying SCR 11 to reverse the polarity of the charge on the commutating capacitor. Upon the polarity of the charge on the commutating capacitor being reversed, blocking diode 20 blocks and saturable reactor 18 is driven back towards positive saturation in the previously described manner. During the interval of time that the saturable reactor 18 is unsaturated, it will hold off the potential on the commutating capacitor 19. Also during this interval triac 51 is commutated off because of the reverse polarity of the potential now applied across it. Thereafter, upon the saturable reactor 18 again be driven back into positive saturation, the positive potential at the dot side of the commutating capacitor turns on diode 49 and thereby gates on triac 51 to cause it to conduct current in the reverse direction because of the reversal in polarity of the potential between point 25 and the dot side of commutating capacitor 19. Upon triac 51 being turned on in the reverse direction, the charge on the commutating capacitor 19 is discharged through the saturated reactor, triac 51, and feed back diode 26 to develop a reverse polarity bias potential across load current carrying SCR 11 and thereby commutate it off. From this description, it can be appreciated that the triac 51 functions in place of the auxiliary SCR 21 in the circuit arrangement of FIGURE 6 at the time when the charge on the commutating capacitor 19 is oscillated around to reverse its polarity, and at this time, conduction through the triac 51 takes place in the direction of the solid arrow. At the time when saturable reactor 18 reaches negative saturation, the reverse polarity charge on the commutating capacitor 19 is discharged through triac 51 in a reverse direction indicated by the dotted arrow so that the triac 51 functions in place of the coupling diode 22. Accordingly, it can be appreciated that the single triac device 51 replaces two elements comprised by the auxiliary SCR 21 and the coupling diode 22 of the circuit arrangement of FIGURE 6.

Figure 11:
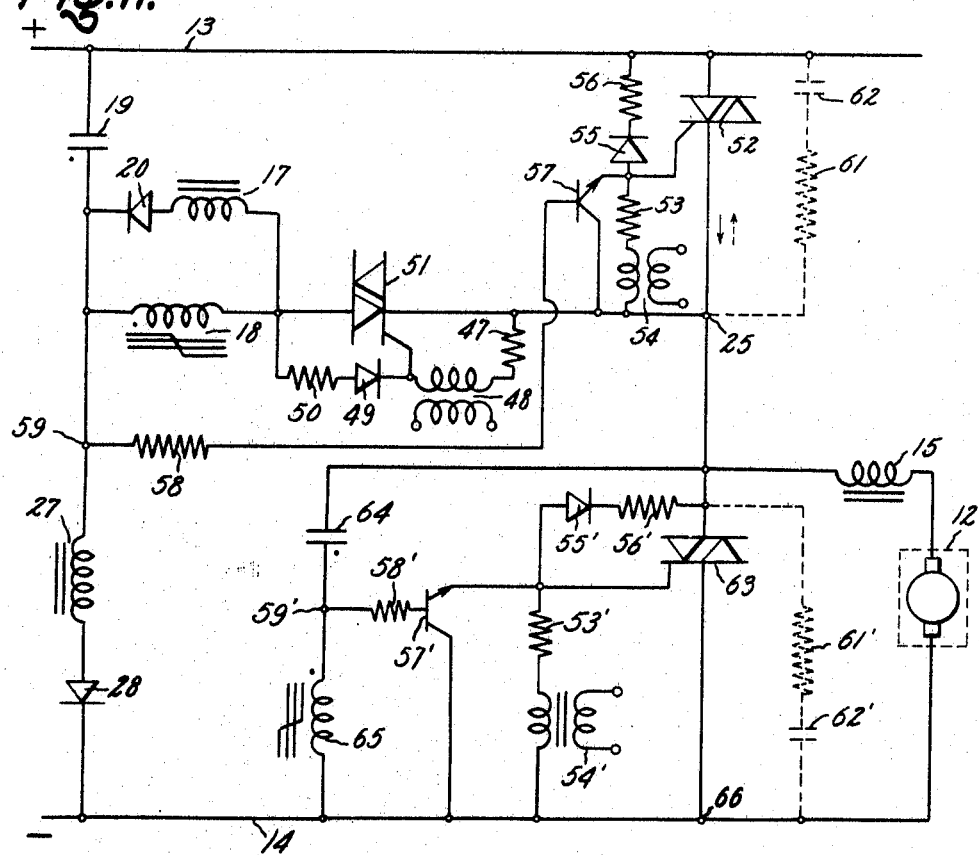
FIGURE 11 is a detailed circuit diagram of an all triac version of the circuit shown in FIGURE 10.

FIGURE 11 of the drawings illustrates an all triac version of the circuit shown in FIGURE 10. In FIGURE 11, the load current carrying silicon controlled rectifier 11 and feed back diode 26 of FIGURE 10 has been replaced with a load current carrying gate turn on, non-gate turn off solid state triac bi-directional conducting device 52. The control gate of the triac 52 is connected through a limiting resistor 53 and pulse transformer 54 to a source of control gating on signal pulses. For a purpose that will be discussed more fully hereinafter, the control gate of the triac 52 is also connected to the anode of a diode 55 whose cathode is connected through a limiting resistor 56 to the positive terminal 13. In addition to these connections, clamping circuit means are provided for clamping off the gate of triac 52 during the commutation of triac 52. For this purpose, the control gate of triac 52 is connected to the emitter electrode of an NPN junction transistor 57. The collector electrode of transistor 57 is connected directly to the negative or cathode terminal of the triac device 52, and the base electrode is connected through a limiting resistor 58 to the juncture 59 of the commutating capacitor 19 and the saturable reactor 18. For the purpose of limiting the rate of rise of reapplied voltage across the triac 52 when it is commutated off, a limiting resistor 61 and series connected capacitor 62 shown in dotted line form, may be inserted between the positive terminal 13 and the negative electrode or cathode of the triac device 52, if desired, or if the triac 52 is particularly susceptible to $dv/dt$ firing.

The circuit of FIGURE 11 differs from the FIGURE 10 circuit also in the substitution of a coasting and pump back, gate turn on, non-gate turn off solid state triac bi-directional conducting device 63 in place of the coasting diode 16 of the arrangement shown in FIGURE 10. Similar to the triac 52, triac 63 likewise has its gate electrode connected through a limiting resistor 53' and pulse transformer 54' to a third source of gating control signals. The control gate of triac 63 is likewise connected through a diode 55' and limiting resistor 56' back to the positive terminal or anode of the triac device 63. Further, the control gate of triac 63 is connected to a clamping circuit means comprised by an NPN junction transistor 57' whose collector electrode is connected directly to the negative terminal or cathode of the triac device 63 and whose emitter electrode is connected to the gate of triac 63. The base electrode of transistor 57' is connected through a limiting resistor 58' to the juncture 59' of a commutating circuit means comprised by a commutating capacitor 64 and saturable reactor 65 connected in series circuit relationship across the triac device 63. A series connected resistance-capacitance network 61', 62' may also be connected across the triac device 63 in parallel with the filter inductance 15 and load 12 to limit the rate of rise of reapplied voltage across the triac 63, if desired.

In operation, the circuit of FIGURE 11 operates similar to the circuit of FIGURE 10 in many respects, but in addition is capable of performing one additional function. That is to say, the circuit of FIGURE 11 is capable of operating in a first mode where current is supplied to the load device 12 from the power supply, and also is capable of operating in a second mode where the load 12, which for example might constitute an electric trolley coasting down hill, is employed as a generator to pump electric power back into the power supply connected across terminals 13 and 14. The first mode of operation where the load 12 is being supplied power from the direct current power supply will be described first.

Assume that the triac 52 is in its blocking condition and that the commutating capacitor 19 has been fully charged to essentially the full potential of the direct current power supply by inductor 27 during the previous commutation interval. Triac 51 will be in its blocking condition so that the charge on commutating capacitor 19 is maintained and that likewise, triac 63 is in its blocking condition. Upon the load current carrying triac 52 being gated on by the application of a gating on signal to the gate thereof from pulse transformer 54, load current flows through triac 52, coasting filter 15 and load 12 in precisely the same fashion as the SCR circuits described previously. Thereafter, just prior to the time that is desired to commutate off the triac 52, triac 51 will be gated on by a gating signal pulse applied to its gate by transformer 48. Upon this occurrence, the charge on commutating capacitor 19 is oscillated 180° through linear inductance 17, triac 51, and triac 52 to reverse the polarity of charge on the commutating capacitor 19. This reversal of charge results in turning off triac 51 in the manner previously described in connection with FIGURE 10. The reversal of charge on the commutating capacitor 19 drives the dot side of the capacitor 19 positive with respect to terminal 13, and might tend to produce a gating on signal on the gate of triac 52 during the commutation interval. However, this positive potential is supplied also through the limiting resistor 58 to the base electrode of the NPN transistor 57 to cause this transistor to become fully conductive, and thereby clamp the gate of triac 52 to the potential of the negative or cathode electrode of triac 52, and hence it is at the same potential as the point 25. Accordingly, it can be appreciated that the transistor 57 in effect negatives the reaction of the diode 55 and resistor 56 connection during the commutating operation. Thereafter, upon the saturable reactor 18 being driven back into positive saturation so that the potential across it is now negative at the dot end, the triac 51 is turned on in the reverse direction by the diode 49 and resistor 50. Upon triac 51 being turned on in the reverse direction, the point 25 is immediately jumped to a potential approximately double the supply voltage to reverse bias load current carrying triac 52 and thereby turn it off. The jump in potential of point 25 to which the control gate of triac 52 has been clamped by transistor 57, also causes the diode 55 to be rendered conductive, and apply a gating signal pulse to the control gate electrode of the triac device 52 to cause it to conduct feedback current in a reverse direction shown by the dotted arrow, in the manner of the feedback diode 26. These two phenomenon occur at the same instant. That is, load current conduction through triac 52 in the direction of the solid arrows is terminated because of the reverse polarity potential applied across the device from commutating capacitor 19, and feedback current conduction in the direction of the dotted arrow is initiated. This action can be better understood if it is visualized that the triac device 52, while it is bi-directional in its conducting characteristic, has essentially two different parallel paths through which conduction takes place. Accordingly, the path which allows conduction in the direction of the solid arrow becomes blocking as a consequence of the commutation operation, while the path which allows conduction in the direction of the broken arrows becomes conducting as a consequence of the gating pulse applied to the control gate by diode 55 and resistor 56. As a result, the triac 52 will continue to conduct in the direction shown by the broken arrow in the same manner as the feedback diode 26 of the circuit shown in FIGURE 10, and described more fully with relation to FIGURE 4 of the drawings. Feedback current conduction in the direction of the broken arrows through triac 52 then continues until such time that the potential at point 25 becomes equal to or less than the potential at terminal 13, upon which occasion conduction through the triac device 52 ceases altogether, and the device reassumes its blocking condition. Upon this last mentioned occurrence, it will be noted that full potential of the direct current power supply will be reapplied across the conduction path through the triac device 52 which allows load current conduction in the direction of the solid arrows. If the rate of rise of the reapplied voltage is too steep, certain types of triac devices 52 will be fired due to a characteristic which is known as $dv/dt$ firing. In order to obviate the $dv/dt$ firing of the triac so that it becomes conducting in the direction of the solid arrow, resistor 61 and capacitor 62 may be coupled across the triac so as to limit the rate of rise of reapplied voltage across the device thereby obviating any difficulty due to this characteristic.

Upon the load current carrying triac 52 being commutated off in the above-described manner, the collapsing magnetic field of the filter inductance 15 tries to supply load current to the load 12. At this point, the coasting triac 63 is fired by the application of a gating signal pulse from the gating transformer 54' to the control gate thereof. Upon the coasting triac 63 being rendered conductive, it operates in much the same fashion as the coasting diode 16 described with relation to the circuit shown in FIGURES 1, 4, 6, and 10.

Prior to triac 63 being turned on in the coasting direction the commutating capacitor 64 has been previously charged to essentially the full potential of the direct current power supply during the interval of time that the triac 52 was conducting, and the saturable reactor 65 has been driven into negative saturation so that the potential across it is positive at the dot end. At the point in time that the coasting triac 63 is gated on in the coasting direction as described above, the potential at point 66 goes positive with respect to the dot end of the saturable reactor 65 so that it is driven out of positive saturation toward negative saturation. During the interval of time that the saturable reactor 65 is unsaturated, the potential across the commutating capacitor 64 is held off from being applied across the coasting triac 63, or across the load 12 and filter inductance 15. During this interval of time, the filter inductance 15 discharges completely, and the potential of the point 66 again goes negative with respect to point 25. This results in reversing the potentials across coasting triac 63, thereby turning it off so that it no longer conducts in the coasting direction and allows it to resume its blocking condition. The design of the circuit must be such that coasting triac 63 is returned to its blocking condition, prior to the load current carrying triac 52 being gated on to initiate a cycle of operation. At this point in the cycle for this mode of operation of the power circuit of FIGURE 11, both coasting triac 63 and load current carrying triac 52 are in their blocking condition thereby returning the circuit to its original state ready for a new cycle of operation.

Considering the circuit of FIGURE 11 in its second mode of operation, that is, when load 12 might be for example an electric trolley car that is coasting down hill, and hence generating current. Under these conditions, it would be desirable to supply the current generated by load 12 back into the direct curent power supply. When operating under these conditions, the load current carrying triac 52 is initially in its blocking condition, and the coasting triac 63 is periodically turned on and off by the application of a suitable gating-on signal to the input terminals of the pulse transformer 54'. When thus turned on, the coasting triac 63 will be commutated off by the operation of the commutation circuit means 64, 65 in the manner previously described with relation to FIGURE 1 in connection with the known "Morgan Circuit" saturable reactor-commutating capacitor commutation operation. Each time that the triac 63 is gated on, the filter inductance 15 will be charged with the current from load 12 which in this mode of operation of the circuit is acting as generator and hence, will be referred to as load generator 12. Upon the coasting triac 63 being commutated off, the potential across the filter inductance 15 adds to the potential of the load generator 12 to drive the potential of point 25 positive with respect to the terminal 13. This causes triac 52 to turn on and conduct current in the feed back direction by reason of the application of a gating pulse to the gate electrode thereof by the diode 55 gating circuit means. Power will then be pumped back from the load generator 12 and filter inductance 15 until such time that the filter inductance 15 is discharged sufficiently to allow the potential of the point 25 to drop to a value equal to or slightly below the value of potential of the terminal 13. This results in reversing the polarity of the potential across the triac 52, turning it off, and allowing it to resume its blocking condition. Upon this occurrence, the circuit resumes its original condition thereby completing one cycle of the second mode of operation, and the coasting and feed back triac 63 can then be again gated on in the feed back direction to initiate a new cycle.

From the above description, it can be appreciated that by reason of the bi-directional conducting characteristic of the triacs 52 and 63, the circuit of FIGURE 11 can be operated in either one or two modes to supply current to a load 12, or to feed current generated by a load generator to the power source as determined by the conditions of operation of the load. It, therefore, can be appreciated that the circuit of FIGURE 11 makes a highly efficient time ratio control power circuit for use with traction motors, for example, used in driving electrically operated vehicles.

FIGURE 12 of the drawings shows a different form of a new and improved time ratio control power circuit constructed in accordance with the invention. The embodiment of the invention shown in FIGURE 12 is in many respects similar to the circuit of FIGURE 4 insofar as construction and operation of the commutation circuit means employed is concerned. However, in place of the gate turn on, non-gate turn off solid state silicon controlled rectifier device 11 used in the circuit of FIGURE 4, a non-gate turn on, non-gate turn off solid state $dv/dt$ fired silicon controlled rectifier 71 and feed back diode 26, is employed in the circuit arrangement of FIGURE 12. The silicon controlled rectifier 71 may be a conventional gate turn on silicon controlled rectifier wherein the gate is open circuited, and instead a technique known as $dv/dt$ firing of the silicon controlled rectifier 71 is employed. For this purpose, the non-gate turn on silicon controlled rectifier 71 is connected in series circuit relationship with a first small saturable reactor 72, and a second somewhat larger saturable reactor 73 having a somewhat longer time constant than the saturable reactor 72. This series circuit is in turn connected in series circuit relationship with a filter inductance 15 and load 12 across the direct current power supply. A coasting rectifier 16, similar to the arrangement of FIGURE 4, is connected in parallel with filter inductance 15 and load 12, and a feed back diode 26 is connected in parallel with the non-gate turn on SCR 71. The commutation circuit means comprised by the commutating capacitor 19, diode 20, and linear inductance 17, saturable reactor 18, auxiliary SCR 21 and coupling diode 22 is identical in construction and operation to the commutation circuit means described in relation to FIGURE 4, and hence will not be again described.

In order to turn on the open circuited gate SCR 71 and supply load current to the load 12, firing circuit means are provided which include a pulsing capacitor 74 having one plate connected to the juncture of the non-gate turn on SCR 71 and the small saturable reactor 72. The remaining plate of the pulsing capacitor 74 is connected between the juncture of the second small saturable reactor 73 and the non-gate turn on SCR 71. This juncture is also connected through a parallel connected resistor-capacitor 75, 76 and through a small third auxiliary SCR 77 back to the negative terminal 14. The third auxiliary SCR 77 has a commutation circuit means comprised by a series connected saturable reactor 78 and commutating capacitor 79 connected in parallel circuit relation therewith for commutating off the third auxiliary SCR 77 in the manner of a conventional saturable reactor commutating capacitor Morgan circuit type commutation operation. Since only a small (low current rating) auxiliary SCR 77 is required, the components of the firing circuit means likewise can be small and relatively inexpensive.

In operation, the circuit of FIGURE 12 functions in the following manner. Consider first that the non-gate turn on SCR 71 is in its blocking condition, in which event, the pulsing capacitor 74 will be charged to essentially the full potential of the direct current power supply through load 12, filter inductance 15, and the saturable reactors 72 and 73. This operation will function to drive the saturable reactors 72 and 73 into positive saturation so that the potential across them is positive at the dot end.

With the circuit in this condition, the third auxiliary SCR 77 is in its blocking condition. At the point in time when it is desired to supply load current to the load 12, a gating on signal is supplied to the gate of the small third auxiliary SCR 77. Upon SCR 77 being rendered conductive, charging capacitor 74 attempts to discharge through the now conducting third auxiliary SCR 77, the load 12, filter inductance 15, saturable reactor 72. The saturable reactor 72 however unsaturates and temporarily holds off the potential of capacitor 74 for a short period of time. As a consequence the point 25, and hence the cathode potential $e_K$ of SCR 71 is quickly driven to a negative potential substantially double that of the negative bus 14. This results in applying a very steep pulsed squarewave shaped potential across the non-gate turn on SCR 71. This very steep pulsed squarewave potential provides a very large change in voltage across SCR 71 in a very short time, and thus has a high $dv/dt$. The high $dv/dt$ voltage pulse in effect causes an avalanche conduction condition through the non-gate turn on SCR 71 thereby turning it full on almost instantaneously. Thereafter, the saturable reactor 72 is immediately driven back into positive saturation so that the high potential across SCR 71 is immediately removed to avoid possible damage to the SCR 71, and returns the SCR to normal operating conditions. The SCR 71 then continues to conduct and to supply load current to the load 12 for a desired interval of time. When it is desired to commutate off the SCR 71, auxiliary SCR 21 is turned on and then operates in the manner described with relation to the circuit shown in FIGURE 4 to turn off the SCR 71. In the interim, the commutation circuit means 78, 79 is associated with the small third auxiliary SCR 77 has turned off SCR 77 so that the circuit is then returned to its initial quiescent condition ready for another cycle of operation.

It should be noted that during the commutation operation, the feed back diode 26 around the non-gate turn on SCR 71 functions in precisely the same fashion as the feed back diode 26 of the arrangement shown in FIGURE 4.

FIGURE 13 of the drawings illustrates still a different form of new and improved time ratio control power circuit constructed in accordance with the invention. Again in FIGURE 13, a non-gate turn on, non-gate turn off solid state conducting device 81 is employed; however, in the circuit arrangement of FIGURE 13, the load current carrying controlled conducting device is a bi-directional conducting device which is termed a power diac. The power diac is essentially an NPNPN, five layer junction device capable of conducting large currents of 50 and 100 amperes in either one of two directions through the device, dependent upon the polarity of the potentials applied across the device. The power diac is triggered from its blocking or low conductance condition to its high conducting condition by the application of a high $dv/dt$ firing pulse across its terminals similar to the $dv/dt$ fired SCR of FIGURE 12. It should be noted that the power diac referred to in this application is an entirely different device than its cousin the signal diac which is a low current, three layer junction device designed to operate in the multiwatt region, and used primarily in conjunction with gating circuit applications. For a more detailed description of the power diac device 81, reference is made to an article entitled "Two Terminal Asymmetrical and Symmetrical Silicon Negative Resistance Switches" by R. W. Aldrich and N. Holonyak, Jr. appearing in the Journal of Applied Physics, vol. 30, No. 11, November 1963, pages 1819 to 1824. The power diac device 81 is connected in series circuit relationship with the filter inductance 15 and load 12 across the direct current power supply between terminalls 13 and 14. Commutation circuit means are connected across the power diac device 81 for commutating it off and thus returning it to its blocking condition, and are comprised by the commutating capacitor 19 and elements 17, 18, 20, 27, 28, 47, 48, 49, 50 and 51. Since this commutation circuit means is identical in construction and operation to the commutation circuit means described with relation to FIGURE 11 of the drawings, it will not be described again in detail.

In order to turn the power diac device 81 on and render it conductive when the terminal 13 is positive with respect to the point 25, a first load current firing circuit means is provided which is comprised by a pulsing capacitor 82 connected in parallel circuit relationship with a fixed resistor 83 and a snap action switch turn on controlled conducting means 84. This snap action turn on controlled conducting means may comprise a smaller rated signal diac device mentioned above, a Shockly diode, or one of the bi-directional low current rated diode devices manufactured and sold by the Hunt Electric Company, and known as the Hunt Diode. The snap action switch 84 is similar to the diac device 81 in many of its characteristics; however it will break down in an avalanche manner, and be rendered fully conductive upon the application of a sufficiently high potential across the device. When thus fired, the rate of build up of the firing potential, that is its $dv/dt$, is not important. The snap action controlled conducting device 84 is connected in series circuit relationship with the fixed resistor 83 and a resistor 85 and diode 86 with the series circuit thus comprised being connected between the point 25 and terminal 13. A coupling capacitor 87 is connected in parallel circuit relationship with snap action device 84, resistor 85, and diode 86, and a PNP juncture transistor 88 is connected in series circuit relationship with a resistor 89 across the pulsing capacitor 82. By this arrangement, conduction through the NPN junction transistor 88 controls the rate of voltage build up across the pulsing capacitor 82. With the transistor 88 turned full on, the voltage on capacitor 82 never builds up to a value sufficient to trigger on the snap switch device 84. By varying the rate of conduction through the transistor 88, the rate of voltage build up on the pulsing capacitor 82 can be controlled to control the point at which the snap switch device 84 is switched full on. Upon the snap switch device 84 being switched full on, the charge on capacitors 82 and 87 is connected in series circuit relationship between terminal 13 and point 25, driving point 25 quickly negative with respect to terminal 13. This results in the production of a sharp voltage pulse across power diac device 81 having a high $dv/dt$. As a consequence power diac device 81 is turned on and conducts load current to the load 12.

In addition to the capacitors 82 and 87 and snap switch 84 and their associated components, the firing circuit means for power diac device 81 includes second feed back firing circuit means for turning on the diac device 81 in a reverse direction. This occurs when the polarity of the potentials of points 25 and 13 are reversed so that point 25 is more positive than terminal 13 as to cause the diac 81 to operate as a feed back diode in the manner of the feed back diode 26 for the circuit arrangement shown in FIGURE 4. The second or feed back firing circuit means is comprised by a pulsing capacitor 82', a snap switch 84', a resistor 83', a capacitor 87', a resistor 85', and diode 86' all of which elements are similarly arranged and function in precisely the same manner as the similarly numbered element of the first load current firing circuit. The second feed back firing circuit differs from the first firing circuit, however, in the inclusion of PNP junction transistor 91 which is connected in a parallel circuit relationship with the capacitor 82' and has its base electrode connected to the juncture of a resistor voltage divider network. This resistor voltage divider network is comprised by a pair of resistors 92 and 93 connected in series circuit relationship across the commutating capacitor 19. By this arrangement, as long as the potential on the dot side of the commutating capacitor 19 is negative, the NPN junction transistor 91 will be maintained full off so that the second firing circuit comprised in part by the commutating capacitor 82' can gate on the power diac 81 in the reverse or feed back current direction when the polarity of the potentials at the points 25 and 13 are reversed. For example, the point 25 becomes more positive than the terminal 13 where there is an inductive load 12. Under such conditions, the diode 86' will break down and conduct, and charge pulsing capacitor 82' to a level such that it turns on the snap switch device 84'. This produces a sharp voltage pulse in the previously described manner across power diac 81 thereby turning it on in a reverse or feed back current direction. The power diac 81 will continue to conduct in this direction until the potential at point 25 drops to a value which is less positive than the potential of the terminal 13 whereupon the power diac device 81 shuts off automatically because of the reversal of potential across its terminals. However, it should be noted that while the power diac 81 is conducting in the load current direction, and during the commutation interval when the potential across the commutating capacitor 19 is reversed so that the dot side of the commutating capacitor is positive, the PNP junction transistor 91 will be turned on full so as to shunt the capacitor 82, and will prevent the second firing circuit from turning on the diac 81 during the commutation interval.

Having briefly described the construction of the new and improved time ratio control circuit shown in FIGURE 13, its operation is as follows. Assuming that the power diac 81 is in its non-conducting or blocking condition, then the capacitor 87 will be charged to the full potential of the direct current power supply 13 through the load 12, inductance 15 and resistor 83. Capacitor 82 will be similarly charged through load 12, inductance 15, diode 86, and resistor 85. During the previous operational cycle, the commutating capacitor 19 will have been charged also to essentially the full potential of the direct current power supply by inductance 27. With the circuit in this condition, then the control potential applied to the base of the NPN junction transistor 88 is adjusted so as to allow the potential build up across the capacitor 82 to increase at a rate such that the snap switch 84 is closed or rendered conducting at a desired point in time determined by the load power to be delivered in accordance with the time ratio control principles previously discussed. Thereafter, the two capacitors 82 and 87 which at this point are effectively in series circuit relationship across the diac 81 by reason of snap switch device 84 being turned on, produce a sharp firing pulse having high $dv/dt$ across diac 81 causing it to conduct. Load current will then be supplied to the load 12 from the direct current power supply for as long as the power diac 81 is allowed to conduct in the load current direction.

Just prior to the time that the diac 81 is to be cut off, a gating signal pulse is applied to the gating transformer 48 of triac 51 in the commutation circuit so as to turn on the triac 51. Thereafter, the commutation circuit means comprised by the commutating capacitor 19, diode 20, linear inductance 17, saturable reactor 18, and triac 51 operates in the manner described with relation to FIGURE 11 of the drawings to commutate off the diac 81. During the commutation interval at the time that the charge on the commutating capacitor 19 is reversed so that its potential is positive at the dot side with respect to the terminal 13, the transistor 91 will be turned full on so as to shunt the capacitor 82' thereby preventing the second gating circuit from gating on the diac 81 during the commutation interval. Thereafter, should there be an inductive load 12, the current due to the collapse of the magnetic field around the filter inductance 15 and inductive load 12 causes the coasting rectifier 16 to be turned on. Under these conditions, the point 25 will attempt to go to a potential which is positive with respect to terminal 13. This positive potential will be coupled through the diode 86' to cause the snap switch device 84' to turn on. This results in effectively connecting the capacitors 87' and 82' in series circuit relationship across the diac 81 with the polarity of the potentials of the points 25 and 13 now reversed. At this point in time, the commutating capacitor 19 has been recharged so that the dot side of the capacitor is negative and the transistor 91 is turned full off. Accordingly, the above action results in producing a voltage pulse across the power diac 81 which causes it to turn on and conduct current in the reverse or feed back current direction. While conducting current in this direction, the power diac 81 will pump current from the load 12 and filter inductance 15 back into the direct current power supply. Thereafter, as the filter inductance 15 and the inductive load 12 lose their charge, the potential of the point 25 will drop until its polarity is reversed with respect to the terminal 13, and the diac 81 will be returned to its blocking condition. This results in returning the circuit to its initial operating condition, and readying it for a new cycle of operation.

FIGURE 14 of the drawings shows a different form of firing circuit for use with a time ratio power control circuit of the type shown in FIGURE 13, for example, wherein the number of components is greatly reduced. In the circuit arrangement of FIGURE 14, the single circuit shown provides the gating on functions for gating on the power diac 81 to cause it to conduct in both directions. This simplification is achieved by the addition of a blocking diode 95 connected in the circuit branch of the NPN junction transistor 88 including resistor 89. Additionally, a charging resistor 96 is provided between the point 25 and the capacitor 82 with the connection of the diode 86 being reversed so that its negative electrode or cathode is connected to the juncture of the snap switch device 84 and capacitor 82, and its positive electrode or anode is connected through resistor 85 to the point 25. By this arrangement, when the terminal 13 is positive with respect to the terminal 25, the gating circuit functions in precisely the same manner as the first gating circuit described with relation to FIGURE 13 to cause the diac 81 to conduct current in what shall be termed the load current carrying direction from terminal 13 through the diac to point 25. When the polarities of terminals 13 and 25 are reversed so that point 25 is more positive than terminal 13, this positive potential will be transmitted through the diode 86 to cause the capacitor 82 to be charged up at a rate determined by the time constant of capacitor 82 and resistor 85. During this occurrence, the blocking diode 95 will block the potential from being applied to the junction transistor 88. Thereafter, upon the capacitor 82 reaching a sufficient voltage level, snap switch device 84 is turned on, and capacitors 82 and 87 will be effectively connected in series circuit relationship across the diac 81. This produces a sharp voltage rise across diac 81 causing it to turn on and conduct a reverse or feed back current from the point 25 through the diac to terminal 13.

It should be noted that the gating circuit of FIGURE 14 as well as the gating circuit of FIGURE 13 both provide independent control over the time of turning on the power diac 81 in the forward direction only. There is no independent control over the timing of turning on the diac 81 in the reverse or feed back direction, however, since this occurs automatically whenever the voltage at point 25 goes positive with relation to the terminal 13 unless blocked. In some applications, it may be desirable to independently control the timing of reverse or feed back current flow through the power diac 81. For this purpose, the gating on circuit of FIGURE 15 is provided. The gating on circuit of FIGURE 15 includes the resistor 83 and snap switch device 84 as well as the pulsing capacitor 82. In addition, the NPN junction transistor 88, resistor 89, and diode 95 are provided as well as the resistor 96. It should be noted that in the embodiment of the gating circuit shown in FIGURE 15, the resistor 96 may very well have a different value from the resistor 96 of the FIGURE 14 circuit. However, it serves the same function, and hence has been given the same reference numeral. However, in the FIGURE 15 circuit, the resistor 96 serves to couple the pulsing capacitor 82 across the diac 81, and hence must have as small a value as possible so as not to dissipate this charge, or to too greatly affect the steepness of the applied potential developed across diac 81. In addition to these elements, an additional NPN junction transistor 97 has its collector connected through a resistor 98 and diode 99 essentially to the terminal 13, and its emitter connected to the junction of the snap switch device 84 and resistor 96. The diode 99 has its negative electrode or cathode connected to the terminal 13 with its positive electrode or anode connected through the resistor 98 to the collector of the NPN junction transistor 97. By this arrangement, conduction through either the junction transistor 88 or the junction transistor 97 controls the rate of build up of voltage across the capacitor 82, and hence the time of firing of the snap switch device 84. Depending then upon the relative polarity of the points 13 and 25, either one of the junction transistors 88 or 97 controls the time of firing of the circuit to thereby independently control the turning on of the power diac 81 in either direction. It should be noted that while the circuits of FIGURES 13 through 15 have been disclosed for use in conjunction with power diacs, they may be used also to trigger on $dv/dt$ fired SCR's. However, when thus used they would not require the reverse current firing feature.

Figure 16:
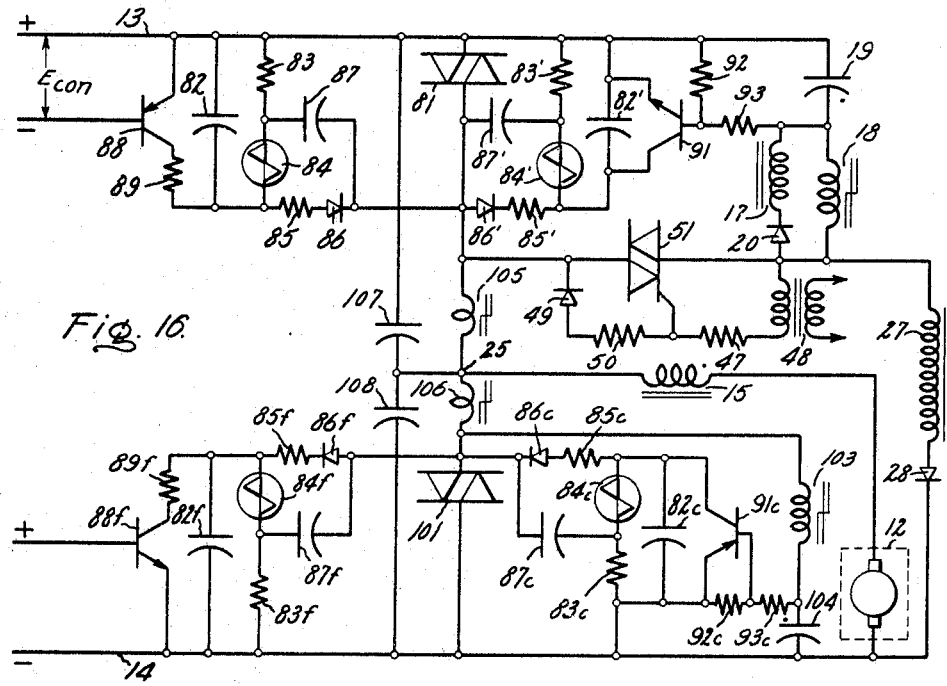
FIGURE 16 is a detailed circuit diagram of a new and improved time ratio control power circuit incorporating many of the features of the circuit shown in FIGURE 13, with the exception that a bi-directional conducting diac is substituted for the coasting rectifier of FIGURE 13.

FIGURE 16 of the drawings shows a still different version of a new and improved time ratio control power circuit using non-gate turn on, non-gate turn off solid state power diac bi-directional conducting devices. The circuit shown in FIGURE 16 of the drawings is similar to the circuit of FIGURE 11 in that it is capable of operating in two modes wherein first load current is applied to a load, and in the second mode of operation the load supplies current back to the power supply. The circuit of FIGURE 16 is similar to the circuit of FIGURE 13 in the construction and operation of the load current carrying power diac 81 and its associated firing circuits and commutation circuit means. Since this portion of the time ratio control circuit of FIGURE 16 was described in detail with relation to FIGURE 13, it will not be described again.

The circuit of FIGURE 16 differs from the FIGURE 13 circuit in that it uses a non-gate turn on, non-gate turn off solid state power diac bi-directional conducting device 101 in place of the coasting diode 16. The power diac 101 has a first firing circuit means connected thereacross which is similar in construction and operation to the first firing circuit for the load current power diac 81 of FIGURE 13, and hence employs similar elements functioning in the same manner. For this reason, the elements of the first firing circuit associated with the coasting and feed back diac 101 have been given the same reference numerals as corresponding elements of the first firing circuit means of power diac 81. However, departing from the convention heretofore established, in order not to get too many primes after a numeral, the numerals of the first firing circuit means associated with diac 101 have been identified by a subscript $f$ after them in order to indicate that they control turning on diac 101 during the power feed back mode of operation of the FIGURE 16 circuit. For example, the pulsing capacitor 82f for the coasting and feed back diac 101 corresponds to the pulsing capacitor 82 for the load current carrying diac 81 of FIGURE 13. While operating the FIGURE 16 circuit in the feeding back of power mode of operation, diac 101 is gated on by the gating circuit 82f through 89f, and it is necessary that the diac 101 be commutated off by external commutation circuit means. Such external commutation is required since the potential of the point 25 will always remain positive with respect to the potential of the terminal 14 during this mode of operation without the external commutation. To provide the required external commutation, a series connected saturable reactor 103 and capacitor 104 are connected in parallel circuit relationship with the diac 101. During the first mode of operation of the circuit of FIGURE 16 when power is being supplied from the direct current power supply to load 12, the diac 101 must serve a coasting diode function. To operate diac 101 in this manner, a second firing circuit means is provided. The second firing circuit is identical to the second firing circuit associated with the load rent carrying diac 81 for turning on diac 1ta1 0enns1z-r current carrying diac 81 for turning on diac 101 at appropriate intervals to serve a coasting function. Because the elements of the second firing circuit means associated with diac 101 are identical in construction and operation to the corresponding elements of the second firing circuit means associated with diac 81, they have been given the same reference numeral. However, again in order to avoid too many primes after a reference numeral, the convention of applying a subscript $c$ after the elements of the second gating circuit means associated with diac 101 is adopted. In all other respects, the second firing circuit means associated with diac 101 is identical to that associated with diac 81. There is one distinction, however, in the construction of clamping transistor 91c for clamping the potential of the pulsing capacitor 82c during the commutation interval when the voltage on the commutating capacitor 104 goes negative at the dot side of the capacitor. Because the potential on the commutating capacitor is negative at this point in the commutation interval, it should be noted that the transistor 91c is a PNP transistor in place of the NPN transistor 91 used in the second firing circuit associated with diac 81. In all other respects, the two second firing circuit means are constructed identically, and operate in the same manner. Additionally, it should be noted that two small saturable reactors 105 and 106 are connected between diac 81 and point 25, and between point 25 and diac 101 respectively. The two small saturable reactors 105 and 106 each serve a pulse shaping function in that their presence steepens the trailing edge of the square wave firing pulse applied across the diacs 81 and 101, thereby assuring that the high firing voltage is removed from the diacs as quickly as possible after they turn on. Isolation between the two firing circuits is achieved by the means of a pair of isolating capacitors 107 and 108 connected between terminal 13 and point 25, and between point 25 and terminal 14, respectively.

Having described the construction of the FIGURE 16 circuit arrangement, its operation is as follows. Consider first that the circuit is in its quiescent condition where diacs 81 and 101 are both in their blocking condition, and the commutator capacitor 19 of diac 81 has been charged essentially to the full potential of the direct current power supply by inductance 27 during the previous cycle of operation. If the circuit is to be operated in the first mode of operation wherein load current is supplied to the load 12, then the load current carrying diac 81 will be gated on at an appropriate time by the control signal applied to the base of NPN transistor 88. Gating on of the diac 81 will supply load current to load 12 for the interval of time required to proportionally control the power supply to the load in the manner described earlier with respect to FIGURES 2 and 3. Just prior to the time that the diac 81 is to be commutated off, a gating signal pulse is applied through the pulse transformer 48 to the triac 51 which results in commutating off the diac 81 in the manner previously described with relation to FIGURE 11 of the drawings. During this commutation interval, the positive potential appearing on the dot side of capacitor 19 turns the clamping transistor 91 full on so that the capacitor 82 is prevented from firing diac 81 during the commutation interval. Subsequently assuming that the load 12 is an inductive load, and that the point 25 tends to go positive with respect to the terminal 13, then the diode 86' will conduct causing the snap switch 84' to be turned on and apply a firing pulse to diac 81. Since diac 81 is now biased in a reverse polarity sense where the point 25 is positive with respect to the terminal 13, this firing pulse, which is sharpened by the saturable reactor 105, results in turning on diac 81 in the reverse direction. Diac 81 then functions to supply current back to the direct current power supply in the well known manner of a feed back diode. Upon the terminal 13 again going positive with respect to the point 25, conduction through diac 81 in the feed back direction terminates automatically thereby restoring diac 81 to its locking condition and conditioning the circuit for a new cycle of operations. It should be noted that just prior to the time that load current diac 81 is turned on in the reverse or feed back direction to function as a feed back diode, the coasting diac 101 is turned on by its second gating circuit comprised by the elements 82c through 93c so that it functions as a coasting rectifier. Turn on of the diac 101 in the coasting rectifier direction will turn on of the load current diac 81 in the feed back direction by a very discrete time interval. Commutation off of the diac 81 in its feed back direction will precede commutation off of the coasting rectifier diac 101 in the coasting direction by the interval of time between the time that the point 25 goes to a less positive potential than the potential of the terminal 13, and the time that the diac 81 is again turned on in its load current carrying direction by the first firing circuit.

Having described the circuit of FIGURE 16 in operation with relation to its first mode of operation, it will now be described under conditions where the load 12 might be an electrically driven vehicle which is coasting down hill, and hence is acting as a generator. Under these conditions it is asumed that both diacs 81 and 101 are initially in their nonconducting or blocking state, and that the potential of the point 25 tends to go positive with respect to terminal 13. Concurrently, the commutating capacitor 104 will be charged positive at its dot side to essentially the full potential of the direct current power supply. Thereafter, at some predetermined rate determined by the amount of power to be pumped back to the direct current power supply, the control signal applied to transistor 88f turns on the first firing circuit means associated with coasting and pump back diac 101 to cause it to be turned on. During turn on the saturable reactor 106 serves a pulse shaping function to protect the diac 101. Gating on of the diac 101 immediately drops the potential of the point 25 to the potential of the terminal 14, so that the load generator starts to charge filter inducance 15 in a direction such that the potential across it is positive at the dot end. Concurrently, the commutation circuit means comprised by the saturable reactor 103 and 104 tries to oscillate the potential on the capacitor 104 to reverse its polarity, and thereby unsaturates the saturable reactor 103 to start driving it towards its reverse polarity saturation condition. The filter inductance 15 is charged for the period of time required for the saturable reactor 103 to be driven into its reverse polarity saturation condition, oscillate the charge on commutating capacitor 104 to thereby reverse its polarity, and again be driven back into its original saturation condition to thereby commutate off diac 101. During this commutation interval, the transistor 91c clamps the potential across the capacitor 82c to thereby prevent the application of a firing pulse to the diac during the commutation operation.

Upon the diac 101 being commutated off during each operating cycle, the potential of the point 25 rises to about double the potential of the direct current power supply due to series addition of the energy of the filter inductance 15 and load generator 12. As a consequence, the load current carrying diac 81 is fired by its second firing circuit when the diode 86' turns on the snap switch 84' thereby turning on the diac 81 to conduct current in its feed back direction. Current is then pumped back into the direct current power supply for the period of time that the point 25 remains at a potential higher than the potential of the terminal 13. At the time that the point 25 drops below the potential of terminal 13, diac 81 is automatically commutated off and returns to its blocking condition thereby readying the circuit for a new cycle of operation. It should be noted that the diacs 81 and 101 are essentially avalanche operated devices in that when they are turned on by $dv/dt$ firing in the above described manner, they are rendered fully conducting across their entire cross section. For this reason, diacs 81 and 101 are capable of operating at higher frequencies than the triac devices, and hence for high frequency operations, the circuit of FIGURE 16 may be preferred over the circuit of FIGURE 11.

Figure 17:
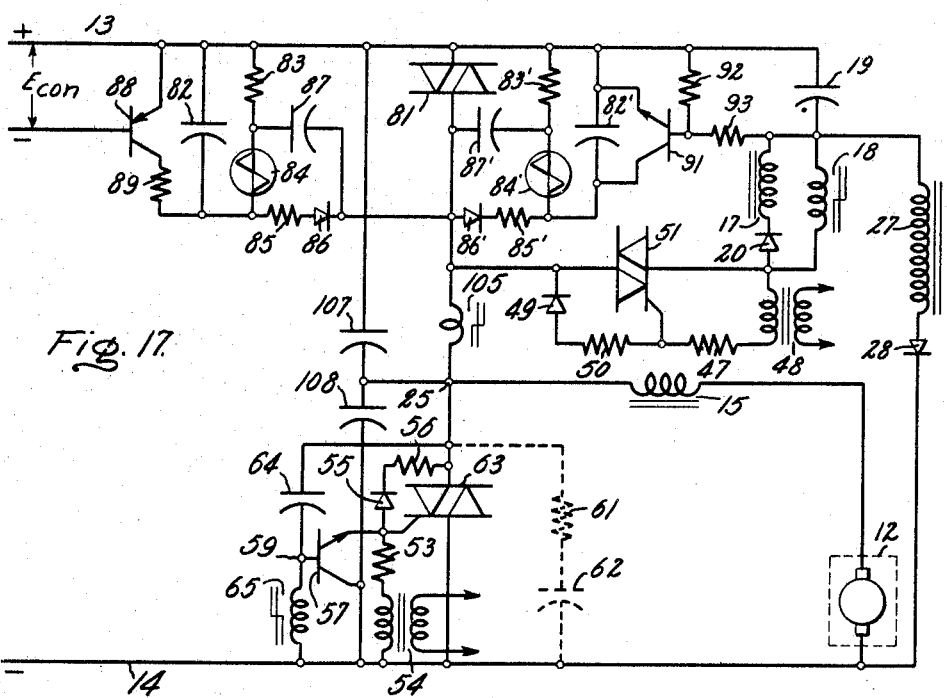
FIGURE 17 is a modification of the time ratio control power circuit shown in FIGURE 13 with the exception that a bi-directional conducting triac is substituted for the coasting rectifier of FIGURE 13.

FIGURE 17 for the drawing illustrates still a different form of new and improved time ratio controlled power circuit constructed in accordance with the invention. The circuit shown in FIGURE 17 is in many respects similar to the time ratio controlled power circuit shown in FIGURE 16 in that it employs a load current carrying turn on, nongate turn off power diac bi-directional conducting device 81 together with its associated firing circuitry and commutation circuit means. The circuit of FIGURE 17 differs, however, from the FIGURE 16 circuit in that it employs a coasting and feed back gate turn on, non-gate turn off triac bi-directional conducting device 63 in place of the coasting and feed back diac device 101 used in the FIGURE 16 circuit. The coasting and feed back triac device 63 shown in FIGURE 17 includes gating circuit means comprised by elements 53 through 57, and commutation circuit means comprised by elements 64 and 65 which are identical in construction and operation to the similar means described with relation to the circuit of FIGURE 11, and hence will not be again described in detail. If desired, or if required because of the *dv/dt* characteristics of the triac 63, a circuit comprised by the dotted resistor 61 and dotted capacitor 62 may be connected across the coasting and feed back triac 63 to limit the rate of rise of reapplied voltage across the device and thereby avoid undesired turning on of the device. Additionally, it should be noted that the isolating means comprised by the capacitors 107 and 108 are included in the circuit arrangement of FIGURE 17 to minimize cross coupling between the load current carrying diac 81, and the coasting and feed back triac 63. In view of the fact that the operation of the load current carrying bi-directional conducting power diac 81, and the operation of the coasting and feed back bi-directional conducting triac 63 previously have been described in detail in connection with other time ratio circuits herein disclosed, their operation in the circuit combination shown in FIGURE 17 is believed to be obvious, and a further description is thought unnecessary.

FIGURE 18 of the drawings shows still another form of time ratio controlled power circuit constructed in accordance with the present invention. The circuit shown in FIGURE 18 is in many respects similar to the time ratio control power circuit shown in FIGURE 16, but differs therefrom in that it employs a load current carrying conventional silicon controlled rectifier 11 and feed back diode 26 connected in place of the load current carrying power diac 81 employed in the FIGURE 16 circuit. The load current carrying silicon control rectifier 11 is gated on by gating signal pulses applied from the pulse transformer 31 connected to its control gate, and is commutated off by the new and improved commutation scheme including commutating capacitor 19, linear inductance 17, saturable reactor 18, blocking diode 20, and the auxiliary triac device 51. The coasting and feed back power diac 101 employs the same elements and operates in precisely the same fashion as the coasting and feed back diac 101 used in the FIGURE 16 circuit arrangement. The load current carrying silicon controlled rectifier device 11 and feed back diode 26 operates in precisely the same manner as described in connection with the circuit shown in FIGURE 10 of the drawings. In view of these last two stated facts, the co-action of the load current carrying silicon controlled rectifier device 11 and feed back diode 26 together with the coasting and feed back power diac device 101 is believed to be obvious in the circuit combination of FIGURE 18, and hence will not be described again in detail. It should be noted however that the load current carrying silicon controlled rectifier device 11 and feed back diode 26 arrangement does not require the use of a small saturable reactor 105 connected in the load current circuit, and that for best operation, the isolating capacitors 107 and 108 should be provided to avoid intercoupling between the operation of the load current carrying silicon controlled rectifier device 11 and the coasting and feed back diac device 101.

FIGURE 19 of the drawings shows still a different form of time ratio control power circuit constructed in accordance with the invention. The circuit shown in FIGURE 19 of the drawings is in many respects similar to the circuit shown in FIGURE 11 with the exception that a coasting and feed back power diac bi-directional conducting device 101 is employed in the FIGURE 19 circuit arrangement in place of the coasting and feed back triac 63 used in the FIGURE 11 circuit. In the FIGURE 19 circuit arrangement, the load current carrying bi-directional conducting triac 52 employs the same gating and commutation circuit elements, and operates in precisely the same fashion as the load current carrying bi-directional conducting triac device 52 described with relation to FIGURE 11. The coasting and feed back power diac bi-directional conducting device 101 of FIGURE 19 employs precisely the same circuit elements in its firing and commutation circuit means, and operates in the same manner as the coasting and feed back diac device 101 employed in the circuit of FIGURE 16. In the light of the previous detailed description of the operation of both of the load current carrying triac device 52 and the feedback and coasting diac device 101, their cooperation in the circuit configuration of FIGURE 19 is believed to be obvious, and a further description thereof unnecessary.

Figure 20:
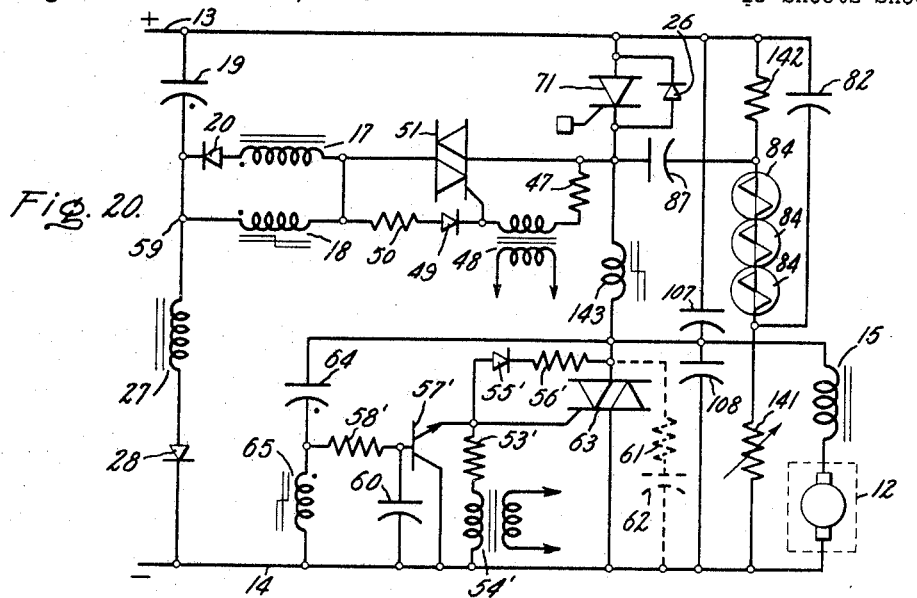
FIGURE 20 is a modification of the time ratio control power circuit shown in FIGURE 11 with the exception that a $dv/dt$ fired SCR and feedback diode is substituted for the load current carrying triac of FIGURE 11, and also discloses a new form of firing circuit for diacs and $dv/dt$ fired SCR's.

FIGURE 20 of the drawings illustrates still another form of time ratio controlled power circuit constructed in accordance with the present invention. The power circuit shown in FIGURE 20 of the drawing is in many respects similar to the time ratio control circuit described with relation to FIGURE 11, but differs therefrom in that it employs a *dv/dt* fired silicon controlled rectifier device 71 having its gate open circuited, and a feed back diode 26 in the place of the load current carrying triac bi-directional conducting device 52 employed in the circuit arrangement of FIGURE 11. The commutation circuit means comprised by the commutating capacitor 19, blocking diode 20, linear inductance 17, saturable reactor 18 and auxiliary triac 51 together with the charging and inductance 27 and charging diode 28 operates to commutate off the *dv/dt* fired SCR 71 in precisely the same manner as the commutation circuit scheme first described with respect to FIGURE 10 of the drawings, and hence will not be again described in detail.

With regard to the firing circuit employed to turn on the *dv/dt* fired SCR 71 having its gate open circuited, this firing circuit is comprised by a pulsing capacitor 82 connected to the juncture of a variable resistor 141 and a plurality of series connected snap action controlled conducting devices 84. The snap action controlled conducting devices 84 may comprise low current rated signal diacs, Shockley diodes, or some similar fast acting control conducting device connected in series circuit relationship with the variable resistor 141, and a fixed resistor 142 between the power supply terminals 13 and 14. The juncture of the fixed resistor 142, and the snap action control conducting devices 84 is coupled through a coupling capacitor 87 to the negative terminal of the *dv/dt* fired SCR 71 with the positive terminal of the *dv/dt* fired SCR 71 being connected to the positive supply terminal 13. By this arrangement, when the capacitor 82 has built up a sufficient charge determined by the setting of the variable resistor 141, the snap action control conducting devices 84 are rendered fully conducting thereby effectively connecting the capacitor 82 and capacitor 87 in series across the *dv/dt* fired SCR 71. This results in sharply dropping the potential of the negative terminal of the *dv/dt* fired SCR 71 thereby causing it to be turned full on in the load current carrying direction. The feed back diode 26 operates in the conventional manner of feed back diodes described with relation to FIGURE 4.

The coasting and feed back triac bi-directional conducting device 63 of FIGURE 20 employs precisely the same elements in its gating circuit means comprised by components 53' through 58', and its commutation circuit means comprised by elements 64 and 65, as does the coasting and feed back triac device 63 in the circuit arrangement of FIGURE 11. Hence, this device operates in precisely the same fashion as was described with relation to FIGURE 11. If desired, a rate of reapplied voltage rise limiting circuit comprised by the dotted resistor 61 and dotted capacitor 62 may be connected across the triac 63 to avoid misfiring of this device at the time that the *dv/dt* fired SCR 71 is turned on. In order to protect the *dv/dt* fired SCR 71, a small saturable reactor 143 may be connected in series circuit relationship with the device. To assure that the transistor 57' continues to conduct and thus clamp the gate of triac 63 throughout the commutation interval, a capacitor 60 may be connected between the base of transistor 57' and terminal 14. In addition, in order to avoid intercoupling between the load current carrying *dv/dt* fired SCR 71 and the coasting and feed back triac 63, the isolating capacitors 107 and 108 may be provided in the manner similar to the circuits described with relation to FIGURES 16 through 19. Since the operation of the $dv/dt$ fired SCR 71 together with its firing and commutation circuit means has been described previously in connection with FIGURE 12 of the drawings, and the construction and operation of the coasting and feed back triac 63 together with its gating circuit means and commutation circuit means has been described fully in connection with FIGURE 11 of the drawings, their co-operation in the circuit combination shown in FIGURE 20 is believed obvious, and further description thereof unnecessary.

Figure 21:
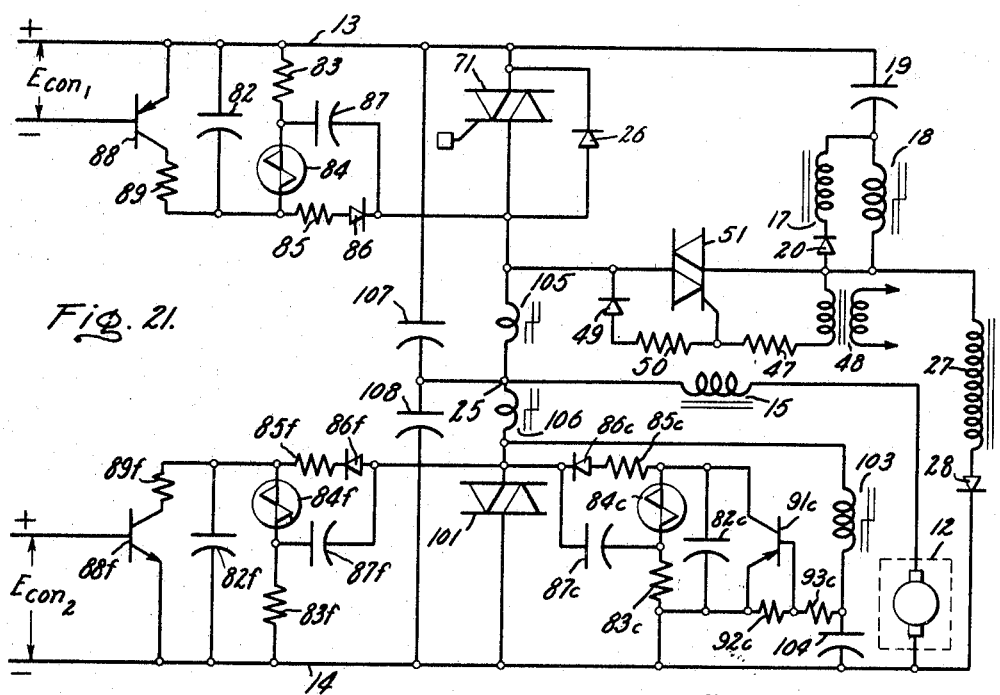
FIGURE 21 is a modification of the time ratio control power circuit shown in FIGURE 16 with the exception that a $dv/dt$ fired SCR and feedback diode are substituted for the load current carrying diac of FIGURE 16.

FIGURE 21 of the drawings illustrates still another form of time ratio controlled power circuit constructed in accordance with the invention. The circuit shown in FIGURE 21 is almost identical in construction and operation to the time ratio controlled circuit shown and described in FIGURE 16. There is an exception, however, in that a $dv/dt$ fired silicon controlled rectifier device 71 having its gate open circuited, and a reverse connected feed back diode 26 is connected in place of the load current carrying power diac bi-directional conducting device 81 of the circuit arrangement shown in FIGURE 16. By reason of this substitution, there is no need for the reverse feed back current firing circuit comprised by the elements 82' through 87' and the clamping circuit comprised by the elements 91 through 93 used in the circuit arrangement of FIGURE 16. In all other respects, the two circuits are identical and operate in precisely the same fashion, and hence a further description of the construction and mode of operation of the circuit shown in FIGURE 21 is believed unnecessary.

FIGURE 22 of the drawings shows still another form of improved time ratio controlled power circuit made possible by the present invention. The time ratio controlled power circuit of FIGURE 22 is in many respects similar to the time ratio controlled power circuit illustrated and described with respect to FIGURE 11, but differs theerfrom in that a coating diode 16 is substituted in place of the coasting and feed back triac bi-directional conducting device 63 employed in the circuit arrangement of FIGURE 11. By this substitution, the coasting and feed back triac 63 together with its associated gating circuitry, commutation circuit means, and clamping circuit means is eliminated thereby considerably simplifying the circuit. It should be noted, however, that the circuit arrangement of FIGURE 22 is capable of only one mode of operation in contrast to the circuit arrangement of FIGURE 11 which is capable of two modes of operation. The circuit arrangement in FIGURE 22 is capable only of supplying load current to the load 12, and will feed back current to the power source only where the load 12 is considerably inductive, and the potential of the point 25 rises higher than the potential of the positive terminal 13 between intervals of conduction of triac 52 in the load current direction. In contrast to this, the circuit of FIGURE 11, by reason of the chopping action provided by the bi-directional conducting triac device 63, is capable of transforming the potential of the point 25 of the FIGURE 11 circuit to a considerably higher value than the potential of the terminal 13 during times when the load 12 operates as a generator. Hence, the second arrangement of FIGURE 11 is capable of economy in operation not possible with the simpler circuit arrangement of FIGURE 22.

FIGURE 23 of the drawings illustrates a new and improved power inverter circuit constructed in accordance with the invention. The inverter circuit shown in FIGURE 23 employs four load current carrying silicon control rectifiers $11_1$, $11_2$, $11_3$, $11_4$, which are used to connect alternate terminals of a load 111 across the power supply terminals 13 and 14. For this purpose, two of the SCRs $11_1$ and $11_4$ are gated on concurrently so that in effect the terminal 112 is connected to terminal 13 and the terminal 113 is connected to terminal 14. Subsequently, the SCRs $11_1$ and $11_4$ are commutated off so that they return to their blocking condition, and the SCRs $11_2$ and $11_3$ are then turned on. With the circuit conducting in this fashion, the terminal 113 is connected to terminal 13 and terminal 112 of load 111 is connected to terminal 14 thus reversing the polarity of the potential supplied across load 111. Subsequently, the load current carrying SCRs $11_2$ and $11_3$ are commutated off, and the circuit is thereby returned to its initial quiescent condition ready for another cycle of operation. From this description, it can be appreciated that the timing or sequence of firing of the load current carrying SCRs $11_1$, $11_2$, $11_3$, $11_4$ serves to connect the load 111 across the terminals 13 and 14 in an alternate manner so as to in effect develop an alternating current flow through the load 111 during successive periods of operation. The SCRs $11_1$ through $11_4$ each have individual commutating circuits which are constructed and operate in a fashion identical to the new and improved commutation circuit disclosed in connection with FIGURE 4 of the drawings, and hence will not be described again in detail. In the event that the load 111 is inductive in nature, the use of the feed back diodes $26_1$ through $26_4$ assures efficient operation of the inverter. Additionally, in order to assure proper charging of the commutating capacitors $19_1$ and $19_2$, it may be desirable to include the charging inductance $27_1$ and diode $28_1$ and the charging inductance $27_2$ and the diode $28_2$, shown in dotted outline form, to avoid commutation failure that might otherwise be caused by improper charging of the commutation capacitors $19_1$ and $19_2$ at low load currents. The operation of the linear inductance $27_1$ and diode $28_1$, for example, in providing a charge to the commutating capacitor $19_1$ has been described previously in connection with FIGURE 6, and further description of this feature of the circuit is not believed necessary.

Figure 24:
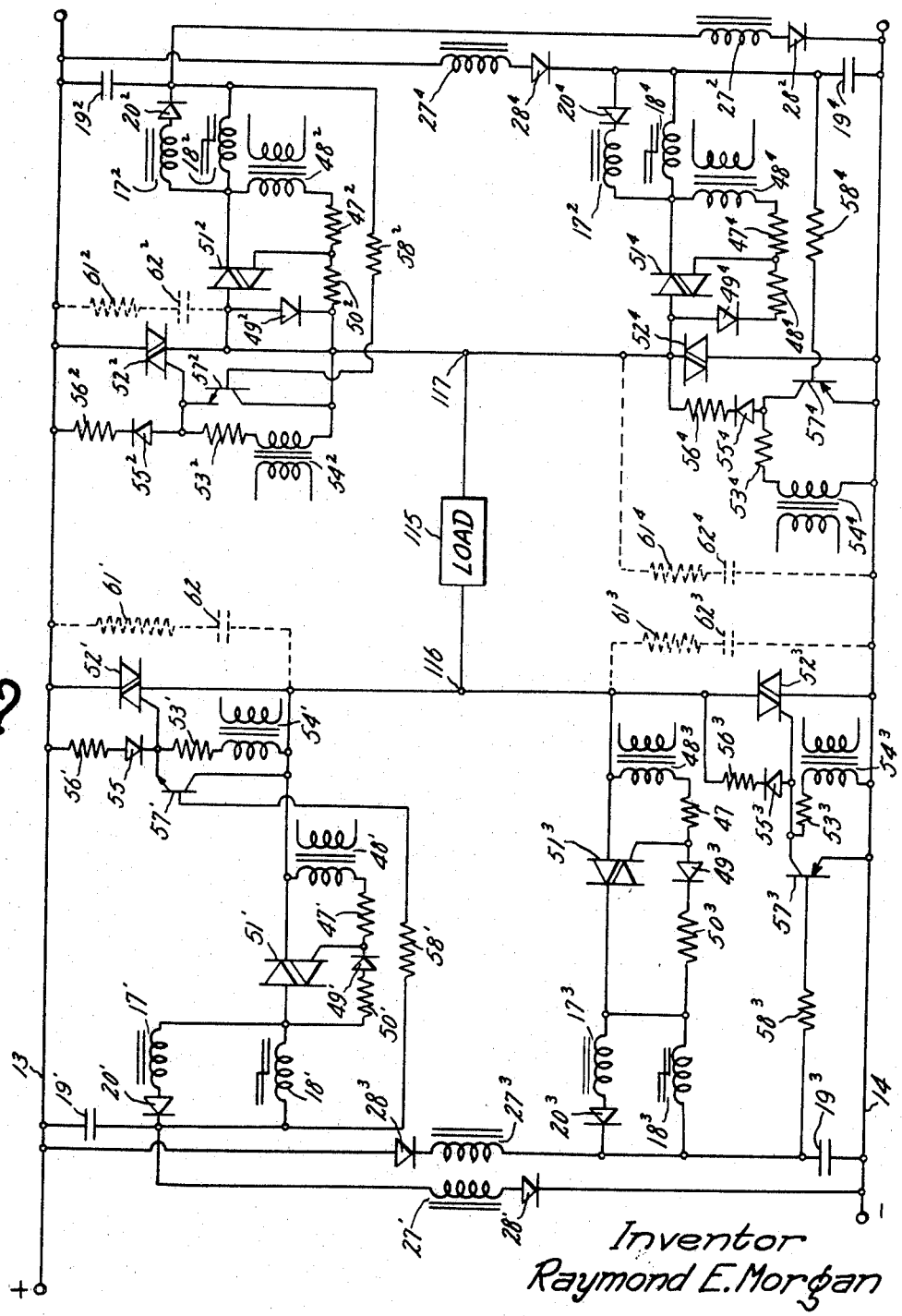
FIGURE 24 is a detailed circuit diagram of a new and improved triac version of the inverter circuit shown in FIGURE 14.

FIGURE 24 of the drawings shows still a different form of improved power inverter circuit using gate turn on, non-gate turn off solid state bi-directional semiconductor triac devices. The inverter circuit of FIGURE 24 performs the same function as the inverter circuit of FIGURE 23 and differs therefrom in that it employs bi-directional conducting gate turn on, non-gate turn off triac solid state devices $52_1$, $52_2$, $52_3$, and $52_4$ in place of the gate turn on, non-gate turn off silicon controlled rectifier solid state devices used in the circuit of FIGURE 23. Referring to FIGURE 24, a load 115 has its alternate terminals 116 and 117 connected through load current carrying, gate turn on, non-gate turn off triac devices $52_1$, $52_2$, $52_3$, and $52_4$ alternately between power supply terminals 13 and 14. The gating and commutation circuit means associated with each of the load current carrying triac devices $52_1$ and $52_2$ are identical in construction and operation to the gating circuit and commutation circuit means described in connection with the load current carrying triac device 52 of FIGURE 11 of the drawings. The gating and commutation circuit means associated with each of the load current carrying triac devices $52_3$ and $52_4$ are mirror versions of the gating and commutation circuit means associated with triac 52 of FIGURE 11, however, they operate in the same manner. For this reason, all of the elements for the circuit of FIGURE 24 have been given the same reference numerals which the corresponding elements were given in FIGURE 11 with the subscript 1, 2, 3, or 4 to show that they are associated with respective ones of the load current carrying triacs $52_1$, $52_2$, $52_3$, or $52_4$. In operation, the gating circuits of the triacs $52_1$ and $52_4$ are phased so that these devices turn on simultaneously and conduct over the same time period. Thus triacs $52_1$ and $52_4$ serve to operatively connect the terminal 116 of load 115 to terminal 13, and terminal 117 of load 115 to terminal 14, respectively. Subsequently, triacs $52_1$ and $52_4$ are commutated off concurrently, and the two triacs $52_2$ and $52_3$ are gated on simultaneously and conduct for the same time period. Upon this occurrence, the terminal 117 will be connected directly to terminal 13 by triac $52_2$ and the terminal 116 of load 115 will be connected to terminal 14 by triac $52_3$ thereby reversing the polarity of the potential applied across the load 115. Subsequently, the two load current carrying triacs $52_2$ and $52_3$ are commutated off thereby returning the inverter circuit to its initial condition ready for a new cycle of operation. Repeated operation of the circuit in this manner then functions to develop an alternating circuit across the load 115.

Figure 25:
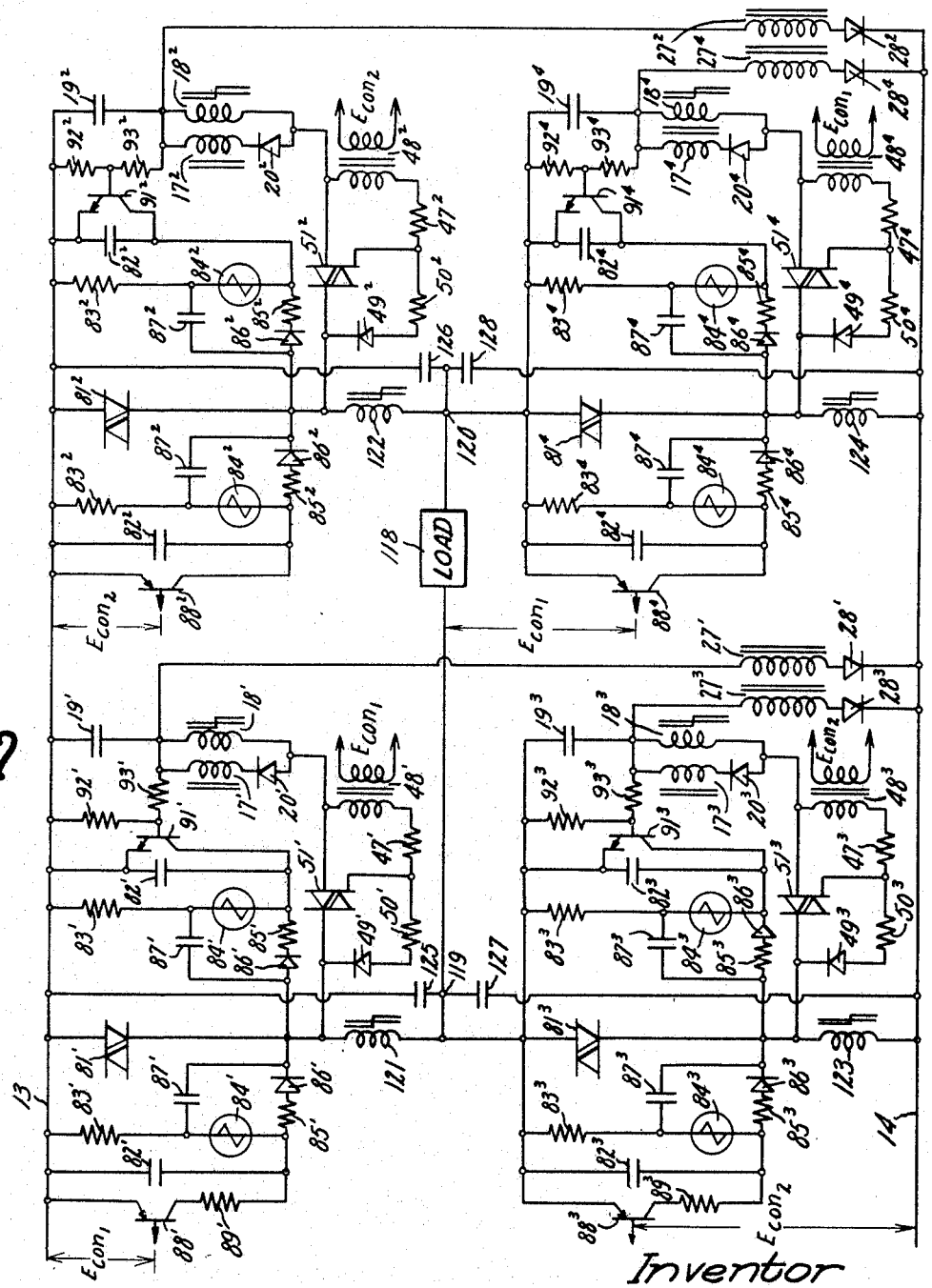
FIGURE 25 is a detailed circuit diagram of a new and improved diac version of the inverter circuit shown in FIGURE 14.

FIGURE 25 of the drawings shows still another inverter power circuit constructed in accordance with the present invention and using non-gate turn on, non-gate turn off solid state power diac semiconductor devices. In FIGURE 25 a load 118 has its alternate terminals 119 and 120 connected across the power supply terminals 13 and 14 alternately by a set of load current carrying power diacs $81_1$, $81_2$, $81_3$, and $81_4$. Each of the load current carrying diac devices 81 has gating and commutation circuit means associated therewith which are identical in construction and operation to the gating and commutation circuit means described in relation to the power diac 81 of the circuit shown in FIGURE 13 of the drawings. Because each of the elements of the gating and commutation circuit means associated with the load current carrying power diacs 81 are the same, and perform the same function as their correspondingly numbered elements of the FIGURE 13 circuit, these elements in FIGURE 25 have been given the subscripts 1 to 4 to indicate which one of the load current carrying diac devices $81_2$ through $81_4$, the elements are associated with. Since they function in precisely the same manner as the correspondingly numbered elements described with respect to the circuit of FIGURE 13, a further description of the construction and operation of these elements is believed unnecessary. It should be noted that because of the abrupt voltage changes occasioned by turning on the load current carrying power diacs 81, some means for isolating the individual gating and commutation circuits must be provided. This means includes an isolating capacitor 125 connected between the terminal 119 and terminal 13 in parallel circuit relationship with the power diac $81_1$ and the small saturable reactor 121, an isolating capacitor 126 connected between terminal 120 and terminal 13 in parallel circuit relationship with the power diac $81_1$ and small saturable reactor 122, an isolating capacitor 127 connected between the terminal 119 and terminal 14 in parallel circuit relationship with the load current carrying diac $81_3$ and small saturable reactor 123, and a fourth isolating capacitor 128 connected between the terminal 120 and terminal 14 in parallel circuit relationship with the load current carrying diac $81_4$ and small saturable reactor 124. By reason of the inclusion of the isolating capacitors 125–128, a triggering on or commutation off of one of the load current carrying power diacs 81 is prevented from interfering with the operation of the neighboring load current carrying power diac connected in series with it across the terminals 13 and 14. The small saturable reactors 121–124 serve a pulse shaping and protecting function similar to the small reactors 105 and 106 described with relation to FIGURE 16 of the drawings. The saturable reactors 105 and 106 hold off the potential of the firing circuit for sufficiently long period of time to insure that the applied voltage to the associated load current carrying power diac has a steep high $dv/dt$ square wave shape to insure triggering on of the power diac, and then when they saturate, remove this high firing potential.

In operation, the inverter circuit of FIGURE 25 operates in much the same fashion as the circuit shown in FIGURES 23 and 24, in that the load current carrying power diacs 81 operate to connect terminals 119 and 120 of load 118 alternately across the power supply terminals 13 and 14 to thereby alternately reverse load current flow through the load 118. This is achieved by firing the load current carrying diacs $81_1$ and $81_4$ simultaneously, commutating these diacs off, then firing simultaneously the two load current carrying diacs $81_2$ and $81_3$, and then commutating these diacs off to thereby complete a cycle of oscillation. By reason of the use of diac load current devices 81, the frequency of operation of the circuit shown in FIGURE 25 can be much higher than with the inverter circuits shown in FIGURES 23 and 24.

From the foregoing description, it can be appreciated that the present invention provides an entire family of new and improved power circuits employing turn on, non-gate turn off controlled conducting devices. These new and improved power circuits can employ a new and improved commutation scheme which allows for a reduction in the size of the components employed in the circuits for a given power rating, and hence can be manufactured economically. Further, it can be appreciated that the invention makes available a whole new family of power circuits which are economical and efficient in operation. When these circuits are designed to employ the new and improved commutation scheme, commutation is assured which is independent of load from a no load to full load condition of operation. By reason of this new and improved commutation scheme, a reduction in the size of the components employed in the circuits is possible, thus, making the manufacture of the circuits less expensive, the additional or auxiliary turn on conducting devices can be much smaller in current carrying capacity than would be possible with previous commutation circuits, and further, many difficulties encountered in the manufacture and design of such previously known circuits are minimized.

Having described several embodiments of the new and improved power circuits made possible by the present invention, it is believed obvious that other modifications and variations of the invention are possible in the light of the above teachings. It is therefore to be understood that changes may be made in the particular embodiments of the invention described which are within the full intended scope of the invention, as defined by the appended claims.

What I claim as new and desire to secure by Letters Patent of the United States is:

1. A new and improved power circuit using turn on, non-gate turn off solid state conducting devices including in combination load current carrying turn on, non-gate turn off solid state bidirectional conducting means operatively connected in series circuit relationship with a load across a pair of power supply terminals that in turn are adapted to be connected across a source of electric potential, first firing circuit means for turning on said load current carrying bidirectional conducting means to cause it to conduct current in at least the load current direction, first commutation circuit means operatively coupled across said load current carrying bidirectional conducting means for cummutating the said means off at desired intervals in the load current carrying direction, coasting and feedback turn on, non-gate turn off solid state bidirectional conducting means operatively connected in parallel circuit relationship with the load, second firing circuit means for gating on said coasting and feedback bidirectional conducting means in either one of two directions depending upon the polarity of the potential thereacross, and second commutation circuit means operatively coupled across the coasting and feedback bidirectional conducting means for commutating the last mentioned means off at desired intervals in the feedback current direction.

2. The combination set forth in claim 1 wherein the first firing circuit means turns on the load current carrying bidirectional conducting means to cause it to conduct current in either direction depending upon the polarity of the potential thereacross, 3. A new and improved power circuit using turn on, non-gate turn off solid state conducting devices including in combination
   a load current carrying turn on, non-gate turn off solid state dv/dt fired silicon controlled rectifier conducting device having its gate open circuited,
   firing circuit means operatively coupled across said load current carrying silicon controlled rectifier for turning on the device at desired intervals to cause it to conduct current in the load current direction,
   a feedback diode connected in parallel circuit relationship with said load current carrying silicon controlled rectifier in a reverse polarity sense,
   said silicon controlled rectifier device and parallel connected feedback diode being connected in series circuit relationship with a load across a pair of power supply terminals that in turn are adapted to be connected across a source of electric potential,
   commutation circuit means operatively connected across said load current carrying silicon controlled rectifier device for commutating the device off at desired intervals in the load current carrying direction,
   a coasting and feedback gate turn on, non-gate turn off solid state triac bidirectional conducting device operatively connected in parallel circuit relationship with the load,
   gating circuit means for turning on asid triac device to cause it to conduct current in either one of two directions depending upon the polarity of the potential thereacross, and
   commutation circuit means for commutating off the said triac device at desired intervals while conducting current in the feedback current direction.

4. The combination set forth in claim 3 wherein said coasting and feedback triac bidirectional conducting device and the gating circuit means and commutation means therefor are replaced by a coasting and feedback turn on, non-gate turn off solid state diac bidirectional conducting device which is operatively connected in parallel circuit relationship with the load,
   firing circuit means operatively connected across said diac device for causing the diac to turn on and conduct current in either one of two directions depending upon the polarity of the potential thereacross, and
   commutation circuit means operatively coupled across said coasting and feedback diac device for commutating the diac off at desired intervals in the feedback current direction.

5. A new and improved power circuit using turn on, non-gate turn off solid state controlled conducting devices including in combination
   a load current carrying gate turn-on, non-gate turn off solid state triac bidirectional conducting device operatively connected in series circuit relationship with a load across a pair of power supply terminals that in turn are adapted to be connected across a source of electric potential,
   gating circuit means for gating on said load current carrying triac device to cause it to conduct current in either direction depending upon the polarity of the potential across the device,
   commutation circuit means operatively coupled across said load current carrying triac device to commutate the first-mentioned triac off at desired intervals in the load current carrying direction,
   a second coasting and feedback solid state triac bidirectional controlled conducting device operatively connected in parallel circuit relationship with the load,
   second gating circuit means for gating on said coasting and feedback triac device in either one of two directions depending upon the polarity of the potential thereacross, and
   second commutation circuit means operatively connected across the coasting and feedback triac device for commutating the second-mentioned triac off at desired intervals in the feedback current direction.

6. The combination set forth in claim 5 further including clamping circuit means interconnecting the second gating circuit means and the second commutation circuit means for clamping off the second gating circuit means during the commutation intervals of the second commutating means.

7. The combination set forth in claim 5 wherein the coasting and feedback triac bidirectional conducting device and the second gating circuit means and second commutation circuit means therefor are replaced by a coasting and feedback turn on, non-gate turn off solid state diac bidirectional conducting device which is operatively connected in parallel circuit relationship with the load,
   second gating circuit means operatively coupled across the coasting and feedback diac device for turning on the diac to cause it to conduct current in either of two directions depending upon the polarity of the potential thereacross, and
   second commutation circuit means operatively coupled across said coasting and feedback diac device for commuating the diac off at desired intervals in the feedback current direction.

8. The combination set forth in claim 7 further including clamping circuit means interconnecting the second gating circuit means and the second commutating circuit means for clamping off the second gating circuit means during the commutation intervals of the second commutating circuit means.

9. A new and improved power circuit using turn on, non-gate turn off solid state controlled conducting devices including in combination
   a load current carrying turn on, non-gate turn off solid state diac bidirectional controlled conducting device operatively connected in series circuit relationship with a load across a pair of power supply terminals that in turn are adapted to be connected across a source of electric potential,
   firing circuit means operatively connected across said load current carrying diac device for turning on the diac to cause it to conduct current in either one of two directions depending upon the polarity of the potential across the device,
   commutation circuit means operatively connected across said load current carrying diac device for commutating the diac off at desired intervals in the load current carrying direction,
   a gate turn on, non-gate turn off solid state coasting and feedback triac bidirectional conducting device, connected in parallel circuit relationship with the load,
   gating circuit means operatively connected to the gate electrode of said coasting and feedback triac device for turning on the triac to cause it to conduct current in either one of two directions dependent upon the polarity of the potential thereacross, and
   second commutation circuit means operatively coupled across the coasting and feedback triac device for commutating the triac off at desired intervals in the feedback current direction.

10. The combination set forth in claim 9 further including clamping circuit means interconnecting the gating circuit means for the triac and the second commutating circuit means for clamping off the second gating circuit means during the commutation intervals of the second commutation means.

11. The combination set forth in claim 9 wherein the coasting and feedback triac bidirectional conducting device and gating circuit means and second commutation circuit means therefor are replaced by a coasting and feedback diac bidirectional controlled conducting device,
   second firing circuit means operatively connected across said coasting and feedback diac device for turning the second-mentioned diac on to cause it to conduct current in either one of two directions depending upon the polarity of the potential thereacross, and second commutation circuit means operatively coupled across the coasting and feedback diac device for commutating the device off at desired intervals in the feedback current direction.

12. The combination set forth in claim 11 further including clamping circuit means interconnecting the second gating circuit means and the second commutation circuit means for clamping off the second firing circuit means during the commutation intervals of the second commutation circuit means.

13. A new and improved power circuit using turn on, non-gate turn off solid state controlled conducting devices including in combination
load current carrying bidirectional conducting means comprised by a load current carrying, gate turn on, non-gate turn off solid state silicon controlled rectifier controlled conducting device operatively connected in series circuit relationship with a load across a pair of power supply terminals that in turn are adapted to be connected across a source of electric potential, and
a feedback diode connected in parallel circuit relationship with the load current carrying silicon controlled rectifier device in a reverse polarity sense,
gating circuit means operatively connected to the control gate of the load current carrying silicon controlled rectifier device for turning it on to cause it to conduct current in the load current direction,
commutation circuit means operatively coupled across said load current carrying silicon controlled rectifier device for commutating the device off at desired intervals in the load current carrying direction.
coasting and feedback turn on, non-gate turn off solid state bidirectional conducting means operatively connected in parallel circuit relationship with the load,
firing circuit means operatively coupled to the coasting and feedback bidirectional conducting means for turning on the said means to cause it to conduct current in either one of two directions depending on the polarity of the potential thereacross, and
second commutation circuit means operatively connected across said coasting and feedback bidirectional conducting means for commutating the said means off at desired intervals in the feedback current direction.

14. The combination set forth in claim 13 wherein the coasting and feedback turn on, non-gate turn on, non-gate turn off solid state bidirectional conducting means is a diac bidirectional conducting device, and wherein
said firing circuit means is operatively coupled across said coasting and feedback diac device for turning on the diac to cause it to conduct current in either one of two directions depending upon the polarity of the potential thereacross, and
said second commutation circuit means is operatively coupled across the coasting and feedback diac device for turning off the device at desired intervals in the feedback current direction.

15. The combination set forth in claim 14 further including clamping means interconnecting the second firing circuit means and the second commutation circuit means for clamping off the second firing circuit means during the commutation intervals.

16. A new and improved power circuit using turn-on, nongate turn-off controlled conducting means including in combination at least first and second turn-on, nongate turn-off solid state controlled conducting means operatively interconnected in series circuit relationship across a pair of power supply terminals which are adapted to be connected across an electric current power supply, at least said second controlled conducting means comprising a bi-directional conducting means, a load circuit including an inductive component, means for connecting one terminal of said load circuit to the juncture of said controlled conducting means, means for connecting the remaining terminal of said load circuit to at least one terminal of the power supply, commutation circuit means operatively connected across at least one of said controlled conducting means, first firing circuit means for selectively rendering a first of said controlled conducting means selectively conducting in a first direction to supply electric current from the source of electric potential to the load circuit in a first load current carrying direction to thereby cause the circuit to operate in a first mode, said commutation circuit means thereafter operating to commutate off of said first conducting means, means for rendering said second conducting means conducting in a second direction whereby load current continues to circulate in the load circuit due to energy storage within the inductive component while maintaining said second conducting means off in the first direction, said first firing circuit means thereafter rendering said first conducting means conducting in the first direction to initiate a new cycle of operation and turn-off said second conducting means from conducting in the second direction.

17. A power circuit according to claim 16 wherein both controlled conducting means are bidirectional controlled conducting means.

18. A power circuit according to claim 17 wherein commutation circuit means are operatively connected across both said first and second bidirecitonal controlled conducting means.

19. A power circuit according to claim 18 further including clamping circuit means operatively coupled to said first firing circuit means for maintaining said first firing circuit means turned off during predetermined parts of an operating cycle whereby misoperation of the power circuit is prevented.

20. A power circuit according to claim 18 further including second firing circuit means for selectively rendering the second controlled conducting means conducting in a first direction to selectively charge the inductive component of the load circuit from energy in the load, the commutation circuit means connected across the second bidirecitonal controlled conducting means thereafter operating to commutate off said second means in the first direction, and fourth means for rendering the first controlled conducting means conducting in a second direction to pump current from the charged inductive component back to the power supply.

21. A power circuit according to claim 20 further including respective clamping circuit means operatively coupled to said first and second firing circuit means for maintaining said first and second firing circuit means turned off during respective predetermined periods of operation whereby misoperation of the power circuit is prevented.

References Cited

UNITED STATES PATENTS

| | | | |
|---|---|---|---|
| 3,138,722 | 6/1964 | Morgan | 315—340 X |
| 3,207,974 | 9/1965 | McMurray | 307—305 |

JOHN S. HEYMAN, Primary Examiner

B. P. DAVIS, Assistant Examiner

U.S. Cl. X.R.

307—305; 315—340; 318—345; 321—43